United States Patent [19]

Yoshinaga et al.

[11] Patent Number: 5,540,858
[45] Date of Patent: Jul. 30, 1996

[54] DISPLAY METHOD AND APPARATUS USING CHIRAL SMECTIC LIQUID CRYSTAL

[75] Inventors: Kazuo Yoshinaga, Machida; Hidetoshi Suzuki, Atsugi; Katsumi Kurematsu, Kawasaki; Yomishi Toshida, Yokohama; Toshikazu Ohnishi, Machida; Hideaki Mitsutake, Tokyo; Nobuo Minoura, Yokohama; Koichi Sato, Sagamihara; Takeo Eguchi, Atsugi, all of Japan

[73] Assignee: Canon Kabushiki Kaisha, Tokyo, Japan

[21] Appl. No.: 304,938

[22] Filed: Sep. 13, 1994

Related U.S. Application Data

[62] Division of Ser. No. 789,655, Nov. 8, 1991, Pat. No. 5,372,745.

[30] Foreign Application Priority Data

| Nov. 9, 1990 | [JP] | Japan | 2-302516 |
| Mar. 26, 1991 | [JP] | Japan | 3-084543 |
| Mar. 26, 1991 | [JP] | Japan | 3-084545 |

[51] Int. Cl.⁶ ............ C09K 19/52; G02F 1/13
[52] U.S. Cl. ............ 252/299.01; 359/104
[58] Field of Search ............ 252/299.01; 359/103, 359/104

[56] References Cited

U.S. PATENT DOCUMENTS

| 4,435,047 | 3/1984 | Fergason | 350/334 |
| 4,707,080 | 11/1987 | Fergason | 350/334 |
| 4,844,597 | 7/1989 | Katagiri et al. | 350/350 S |
| 4,886,718 | 12/1989 | Eich et al. | 430/20 |
| 5,011,623 | 4/1991 | Yoshinaga et al. | 252/299.5 |
| 5,066,107 | 11/1991 | Yoshinaga et al. | 359/45 |
| 5,188,760 | 2/1993 | Hikmet et al. | 252/299.01 |
| 5,258,134 | 11/1993 | Yoshinaga et al. | 252/299.01 |
| 5,268,783 | 12/1993 | Yoshinaga et al. | 359/103 |
| 5,372,745 | 12/1994 | Yoshinaga et al. | 252/299.01 |
| 5,384,069 | 7/1995 | Yoshinaga et al. | 252/299.01 |

FOREIGN PATENT DOCUMENTS

| 0292244 | 11/1988 | European Pat. Off. . |
| 0295106 | 12/1988 | European Pat. Off. . |
| 0451905 | 10/1991 | European Pat. Off. . |
| WO009807 | 10/1989 | WIPO . |
| WO015854 | 12/1990 | WIPO . |

OTHER PUBLICATIONS

Macromolecular Chemistry and Physics 190, No. 12 (1989) 3200–3215.
Macromolecular Symposia No. 24 (1989) 283–301.
Liquid Crystal Polymers, Polymer Bulletin No. 12 (1984) 299–301.

*Primary Examiner*—Shean C. Wu
*Attorney, Agent, or Firm*—Fitzpatrick, Cella, Harper & Scinto

[57] ABSTRACT

A liquid crystal device is constituted by disposing a display layer between a pair of electrode plates. The display layer comprises a mesomorphic polymer and a low-molecular weight mesomorphic compound. The mesomorphic polymer may preferably be a main chain-type ferroelectric mesomorphic polymer having an ester linkage or a mesomorphic polymer derived from a polymerizable mesomorphic compound. The display layer may preferably comprise a ferroelectric mesomorphic polymer having a dielectric anisotropy $\Delta\epsilon$ of −3.0 or below and a low-molecular weight mesomorphic compound incompatible with the mesomorphic polymer and having a positive dielectric anisotropy.

24 Claims, 10 Drawing Sheets

DISPLAY METHOD AND APPARATUS USING CHIRAL SMECTIC LIQUID CRYSTAL

This application is a division of application Ser. No. 07/789,655, filed Nov. 8,1991 now U.S. Pat. No. 5,372,745.

FIELD OF THE INVENTION AND RELATED ART

The present invention relates to a thermo-optical and electro-optical display device, particularly to a liquid crystal device containing a specific mesomorphic polymer and a low-molecular weight mesomorphic compound, a display apparatus using the device and a display method using the device.

Liquid crystal materials have been used for various thermo-optical and electro-optical display devices. These display devices have now been actively developed because of a low driving voltage and low energy consumption. One technical problem of these devices is found in providing a display device of a large area.

In order to produce a display device of a large area easily, it is considered suitable to use a polymeric or polymer liquid crystal. An example of a liquid crystal display device of a thermal writing-type is disclosed in Polymer Communications, Vol. 24, p.p. 364–365, "Thermotropic Liquid Crystalline Polymers 14" by V. Shibaev, S. Kostromin, N. Plate, S. Ivanov, V. Vestrov and I. Yakovlev.

The above-described system, however, has several problems such as poor contrast because of the use of light scattering for readout and a delay in response accompanying the use of a polymeric liquid crystal, so that it has not been put to practical use.

In addition to the above, there have been some proposals for easily producing liquid crystal devices of a large area.

For example, U.S. Pat. No. 4,435,047 to Manchester R & D Partnership discloses a liquid crystal device containing an encapsulated low-molecular weight mesomorphic compound (or liquid crystal) dispersed in polyvinyl alcohol as a polymer matrix. Further, U.S. Pat. No. 4,707,080 discloses a liquid crystal device containing a low-molecular weight mesomorphic compound in a connected tubular form dispersed in a polymer matrix. There has also been reported a liquid crystal device containing a low-molecular weight mesomorphic compound dispersed in a polymer liquid crystal matrix (J. W. Doane, J. L. West, J. B. Whitehead, Jr., D. S. Fredley, "Wide-Angle-View PDLC Displays", 1990 Society for Information Display International Symposium Digest of Technical Papers, Lecture No. 12, 5, p.p. 224–226, May (1990)). The Donne et al. device has been reported to provide improvements in a viewing angle and a scattering degree.

The above-mentioned devices suitable for easily providing liquid crystal displays of a large area have faster response speeds than those of the conventional devices containing a nematic or cholesteric polymer liquid crystal.

However, the above-mentioned devices containing the low-molecular weight liquid crystal dispersed and held in the polymer matrix have had an insufficient interfacial alignment-controlling force, so that it has been difficult to obtain a desirable threshold voltage for matrix driving. As a result, the devices have a drawback in providing a high resolution system, although they can provide a large display area. Further, as an optical modulation principle, the devices utilizes scattering due to a difference in refractive index between the low-molecular weight liquid crystal and the polymer matrix, but it has been difficult to obtain a sufficient refractive index difference. As a result, the devices require considerably thick display layers for effecting sufficient cut-off of light and for providing high contrast. The devices are hampered by a further problem, in that it is difficult to effect gradation in the display when using them. This is because the polymer matrix is slightly soluble in the low-molecular weight mesomorphic compound at the interface therebetween, whereby the resultant solution mixture at the interface shows a similar electric field-response characteristic to that of the low-molecular weight mesomorphic compound. This causes a chain of the matrix polymer to be moved at the interface, resulting in hysteresis when an applied voltage is increased and decreased.

In the liquid crystal device containing a polymer liquid crystal as the polymer matrix, it is possible to obtain a good alignment-controlling force. However, there is still room for improvement as regards the aligned state of the polymer matrix per se. Also, it would be desireable to achieve a faster response speed with no hysteresis in view of a scattering state and contrast of the entire liquid crystal device.

SUMMARY OF THE INVENTION

The present invention has been accomplished in order to remedy the above-mentioned drawbacks of the conventional liquid crystal devices.

An object of the present invention is to provide a large-area liquid crystal device capable of effecting display with a high contrast, a good threshold characteristic and no hysteresis.

Another object of the present invention is to provide a display apparatus and a display method employing the liquid crystal device described above.

According to a first aspect of the present invention, there is provided a liquid crystal device comprising: a pair of electrode plates and a display layer disposed therebetween comprising a main chain-type mesomorphic polymer having an ester linkage and a low-molecular weight mesomorphic compound incompatible with the main chain-type mesomorphic polymer.

According to a second aspect of the present invention, there is provided a liquid crystal device comprising: a pair of electrode plates and a display layer disposed therebetween comprising a mesomorphic polymer and a low-molecular weight mesomorphic compound, wherein the mesomorphic polymer has been formed through polymerization in a mesomorphic state of a composition comprising a polymerizable mesomorphic monomer and the low-molecular weight mesomorphic compound.

According to a third aspect of the present invention, there is provided a liquid crystal device comprising: a pair of electrode plates and a display layer disposed therebetween comprising a mesomorphic polymer having a dielectric anisotropy $\Delta\epsilon$ of –3.0 or below and a low-molecular weight mesomorphic compound incompatible with the mesomorphic polymer and having a positive dielectric anisotropy.

According to a fourth aspect of the present invention, there is provided a display apparatus including: a liquid crystal device according to any one of the above mentioned first to third aspects of the present invention, means for emitting light, means for applying voltage to the device, and means for separating the light into transmitted light and scattered light.

According to a fifth aspect of the present invention, there is provided a display method comprising: illuminating a liquid crystal device according to any one of the above-mentioned first to third aspects of the present invention with light and effecting a display by employing the resultant scattered light.

These and other objects, features and advantages of the present invention will become more apparent upon a consideration of the following description of the preferred embodiments of the present invention, taken in conjunction with the accompanying drawings.

DETAILED DESCRIPTION OF THE INVENTION

Hereinbelow, the present invention will be explained in detail with reference to the drawings.

Figure 1:
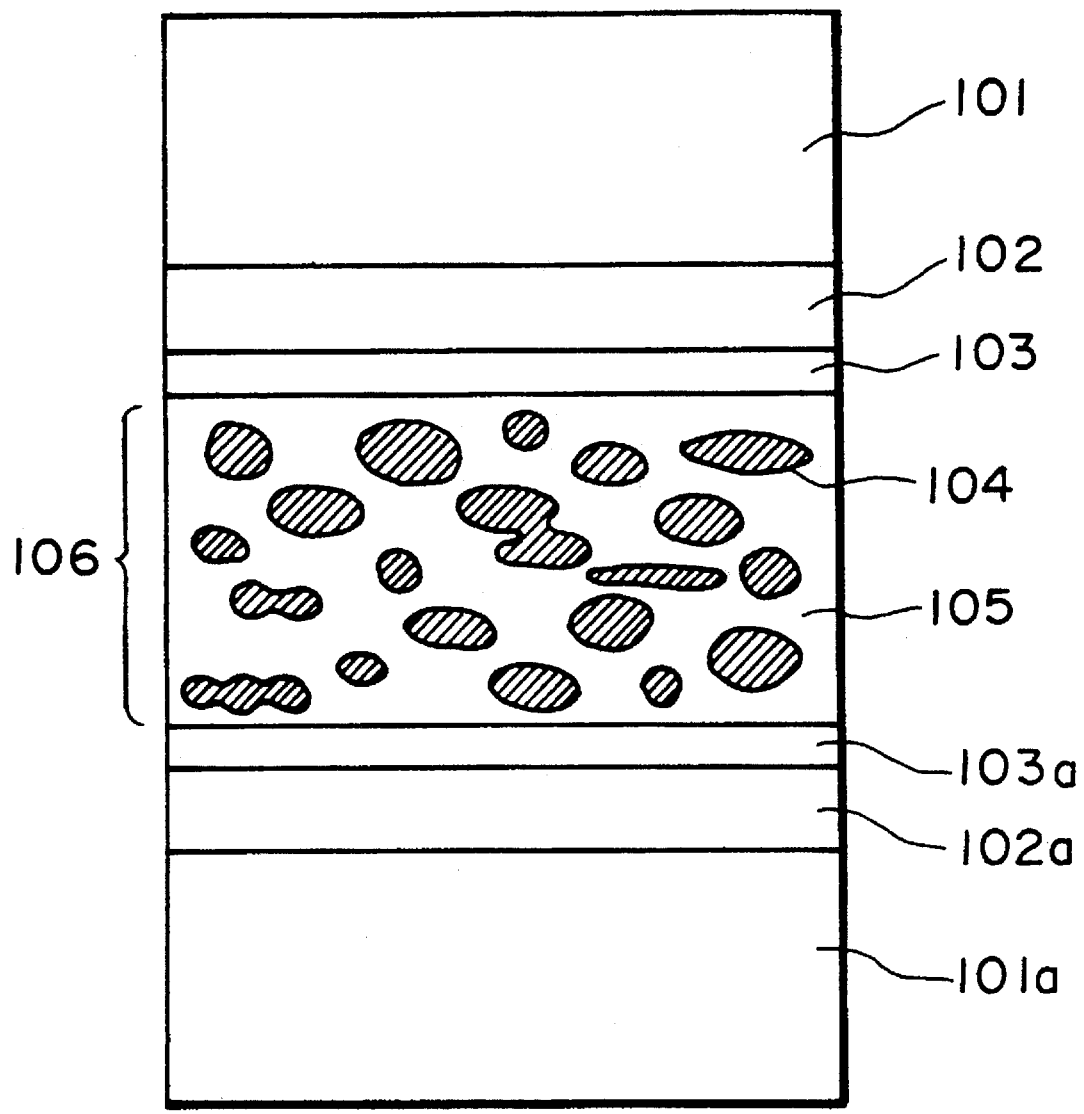
FIG. 1 is a schematic sectional view of a liquid crystal device according to the present invention.

FIG. 1 is a schematic sectional view of an embodiment of the liquid crystal device of the present invention for explanation of the structure thereof.

Referring to FIG. 1, the liquid crystal device includes a display layer 106 particles of a low-molecular weight mesomorphic compound 104 dispersed in a matrix of a main chain-type mesomorphic polymer having an ester linkage 105. The display layer 106 is disposed between a pair of substrates 101 and 101a each having thereon an electrode 102 or 102a and further thereon an alignment control layer 103 or 103a.

Each of the substrates 101 and 101a may comprise glass or plastic, e.g., in the form of plate or film.

Examples of a polymer film used as the substrate may include: a low-density polyethylene film, a high-density polyethylene film (such as "Hibron", a product of Mitsui Toatsu Kagaku K. K.), a polyester film (such as "Torefan", a product of Toray K. K. ), a polyester film (such as "Myler", a product of Du Pont), a polyvinyl alcohol film (such as "Hicellon", a product Nihon Gosei Kako K. K.), a polyamide film (such as "Rayfan", product of Toyo Gosei Film K. K.), a polycarbonate film (such as "Teijin Panlight", a product of Teijin K. K.) a polyimide film (such as "KAPTON", a product of Du Pont), a polyvinyl chloride film (such as "Hishilex", a product of Mitsubishi Jushi K. K.), a polytetrafluoroethylene film (such as "Teflon", a product of Mitsui Fluorochemical K. K.), a polyacrylate film (such as "Sumilate", a product of Sumitomo Bakelite K. K.), a polystyrene film (such as "Styrosheet", a product of Asahi Dow K. K. ), a polyvinylidene chloride film ( such as "Saran Film", a product of Asahi Dow K. K. ), a cellulose film, a polyvinylidene fluoride film (such as "Tedler", a product of Du Pont) and a polyethersulfone film (such as "Sumilite" a product of Sumitomo Bakelite K. K.).

The electrodes 102 and 102a formed on the substrates may include a transparent electrode comprising ITO (indium-tin-oxide) or $SnO_2$, and a metal film comprising Al, Au, Ag, Cu or Cr. It is possible to use the electrodes as an electrode and a reflective layer in a reflection-type display device. The electrodes are formed in a flat or prescribed pattern. The thus prepared substrates with the electrodes may be inclusively referred to herein as "electrode plates".

The alignment control layers 103 and 103a formed on the substrates 101 and 101a with the electrodes 102 and 102a thereon, respectively, may include: inorganic materials such as silicon monoxide, silicon dioxide, aluminum oxide, zirconia, magnesium fluoride, cerium oxide, cerium fluoride, silicon nitride, silicon carbide, and boron nitride; and organic materials such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin, acrylic resin, and epoxy resin. Each of the alignment control layers 103 and 103a may be formed by rubbing a film of the inorganic or organic material described above with velvet, cloth or paper in one direction so as to provide a uniaxial alignment characteristic. Further, it is possible to compose the alignment control layer of two layers, e.g., by first forming a layer of the inorganic material and forming thereon a layer of an organic material. In a preferred embodiment, it is possible to form an alignment control layer on a substrate by oblique vapor deposition. It is also possible to impart an alignment-controlling effect to a substrate after providing an inorganic or organic material or without providing the material by oblique etching. The use of the alignment control layer is effective for uniformly aligning the mesomorphic polymer in one direction.

The alignment control layer may preferably be used also as an insulating layer in addition. Accordingly, the thickness of the alignment control layer may generally have 50 Å–1 micron, preferably 100–5000 Å. The insulating layer also has the advantage of preventing current conduction due to a trace impurity in the display layer 106, whereby the display layer little deteriorate even in a repetitive operation.

In the present invention, the display layer 106 disposed between the electrode plates comprises a matrix of a specific mesomorphic polymer 105 with particles of a low-molecular weight mesomorphic compound 104 dispersed therein. The thickness of the display layer 106 may generally be 0.5–100 microns, preferably 1–50 microns. Below 0.5 micron, it is difficult to obtain sufficient contrast. On the other hand, above 100 microns, it is difficult to drive the liquid crystal device at high speed, as a large driving voltage is required.

In the display layer 106, the mesomorphic polymer 105 constitutes a continuous matrix and the low-molecular weight mesomorphic compound 104 is dispersed therein in any particle shape including spheres or spheroids or further irregularly elongated shapes like bars, inclusive of those attached to a substrate at one end thereof. The diameter of the dispersed particles of the low-molecular weight mesomorphic compound may preferably be 0.1–10 microns, more preferably 0.3–3 microns. Herein, for the shapes other than the sphere the above diameter means the particle diameter of the shorter axis of the dispersed low-molecular weight mesomorphic compound when approximated to a spheroid or a cylindrical bar.

In the present invention, incompatibility of the mesomorphic polymer 105 with the low-molecular weight mesomorphic compound 104 can be recognized as phase separation when observed through a polarizing microscope (magnification=400). The disperse phase can be identified by collecting it and measuring its phase transition temperature by a differential scanning calorimeter (DSC).

The mesomorphic polymer is used in combination with a low-molecular weight mesomorphic compound which is incompatible with the mesomorphic polymer. The mesomorphic polymer can be used in an amount sufficient to form a continuous matrix, and it is generally contained in the display layer in a concentration of 10–70 wt. %. Below 10 wt. %, it is difficult to align the low-molecular weight mesomorphic compound as the alignment-controlling effect of the mesomorphic polymer matrix is insufficient. Above 70 wt. %, it is difficult to obtain a large change in refractive index due to re-alignment of the low-molecular weight mesomorphic compound under application of the driving voltage, whereby the liquid crystal device cannot provide a display having good contrast.

In the present invention, it is possible to match the ordinary index ($n_o$) and/or an extraordinary index ($n_e$) of the mesomorphic polymer with that ($n_o$ and/or $n_e$) of the low-molecular weight mesomorphic compound by selecting an appropriate combination of the mesomorphic polymer and the low-molecular molecular weight mesomorphic compound. However, in the present invention, it is possible to provide a practical liquid crystal device usable as an optical device if a sufficient difference in scattering degree is achieved as a result of an electric field response by the low-molecular weight mesomorphic compound even when the indices are not matched.

The mesomorphic polymer used in the present invention is designed so that the molecules thereof do not respond to the applied electric field. More specifically, the mesomorphic polymer is aligned in the direction parallel to the substrates, whereby the molecules thereof maintain the alignment state if the mesomorphic polymer is used below its glass transition temperature (Tg) or has a negative dielectric anisotropy ($-\Delta\epsilon$), even when the electric field for driving is applied.

The main chain type mesomorphic polymer used as the matrix is not dissolved in the low-molecular weight mesomorphic compound and does not change its alignment state under application of an electric field, as described above. This characteristic of the main chain type mesomorphic polymer may not be exhibited in a side chain-type mesomorphic polymer because the latter's pendant structure might be compatible with the low-molecular weight mesomorphic compound.

It is preferred to use a main chain-type mesomorphic polymer having recurring units containing an ester linkage. The ester linkage contributes much to an increase in dielectric constant of the mesomorphic polymer matrix, thus providing the low-molecular weight mesomorphic compound with a larger effective voltage. As a result, the response speed of the mesomorphic compound to an applied electric field is increased. Further, the mesomorphic polymer having an ester linkage has a good alignment characteristic at an initial stage before the application of an electric field, thus providing a high contrast after the application of the electric field.

As described, the display layer used in the first aspect of the present invention comprises a main chain-type mesomorphic polymer having an ester linkage and a low-molecular weight mesomorphic compound, wherein the mesomorphic polymer is in-compatible with the low-molecular weight mesomorphic compound.

Specific examples of the mesomorphic polymer may include those represented by the following structural formulas.

In the following formulas (1)–(31), p=5–1000, n=5–100 and $1 \leq n_1 < 15$.

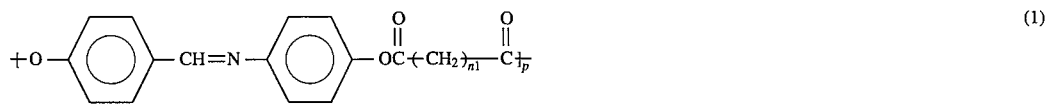

(1)

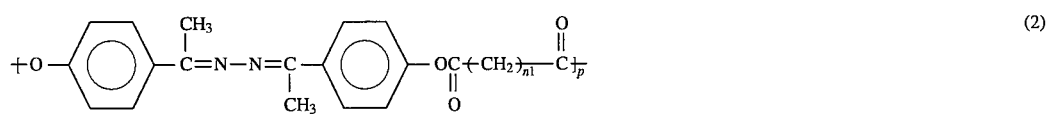

(2)

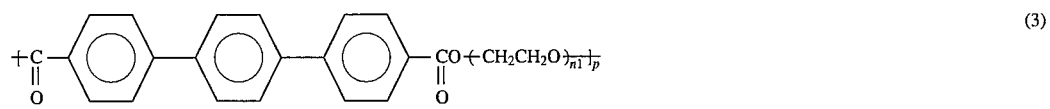

(3)

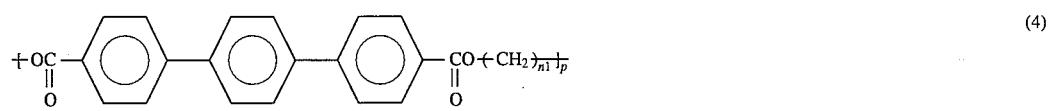

(4)

(5)

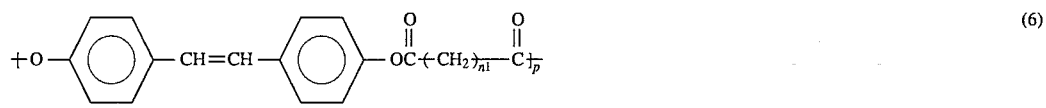 (6)
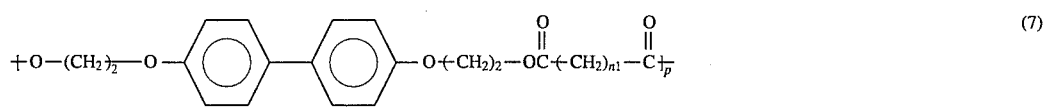 (7)
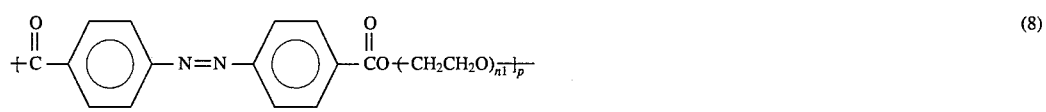 (8)
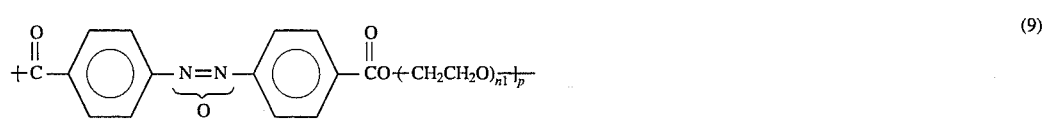 (9)
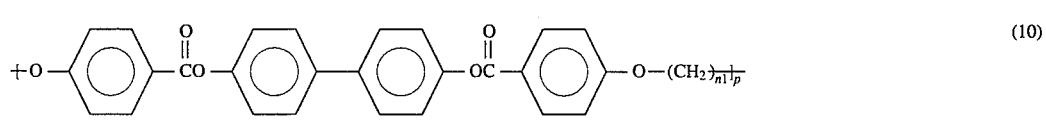 (10)
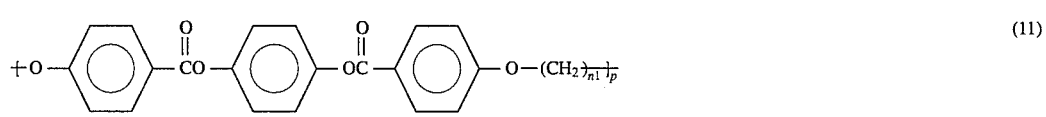 (11)
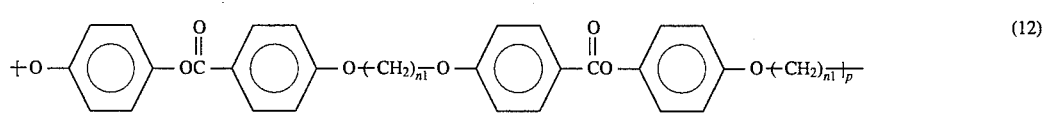 (12)
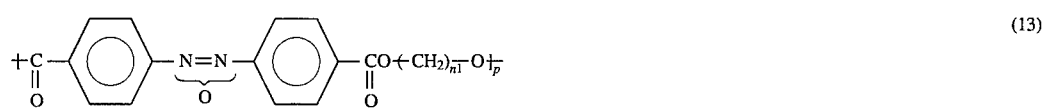 (13)
 (14)
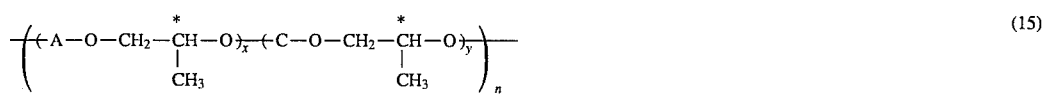 (15)
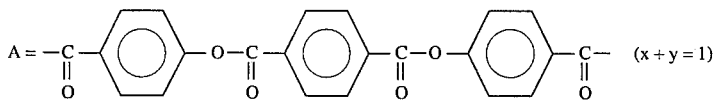 (x + y = 1)
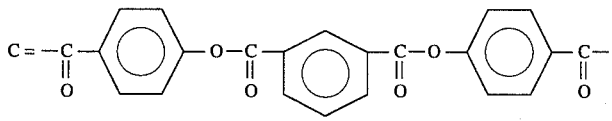
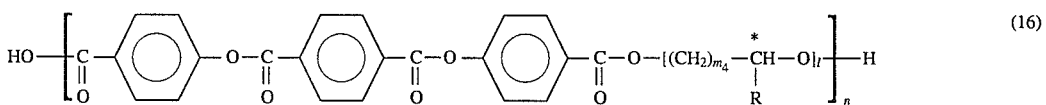 (16)
($m_4 = 1\sim3$, $l = 1\sim20$)

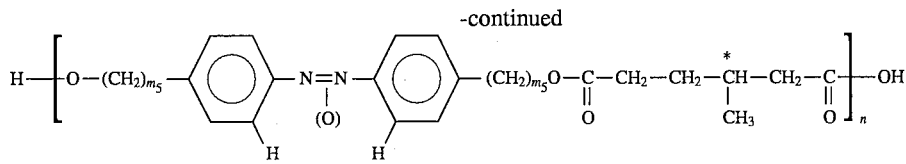
(17)

($m_5 = 0~5$)

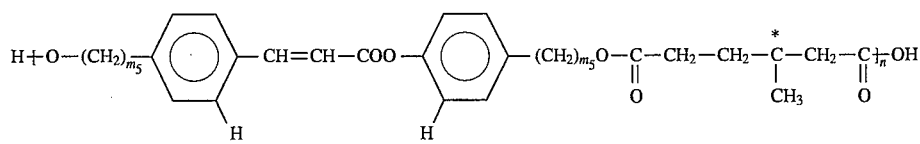
(18)

($m_5 = 0~5$)

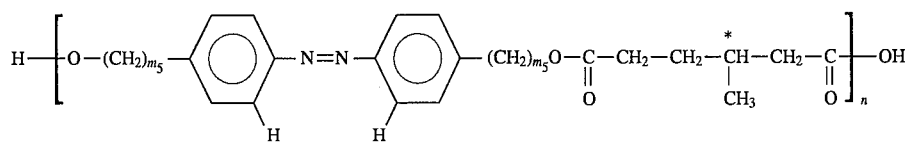
(19)

($m_5 = 0~5$)

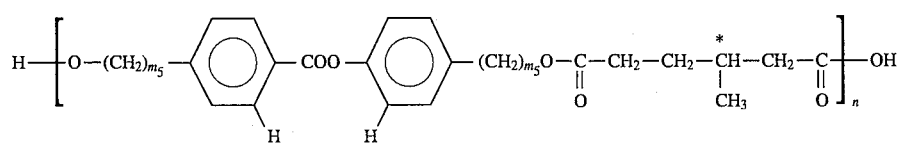
(20)

($m_5 = 0~5$)

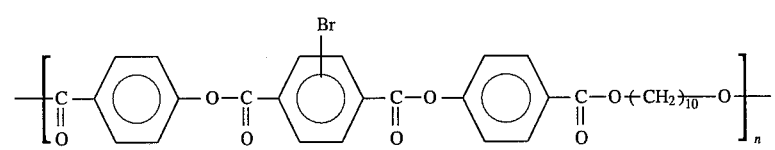
(21)

The mesomorphic polymer of the present invention may be used singly or in combination of two or more species. It is also possible to use a copolymer obtained by copolymerization of two or more polymerizable mesomorphic monomers.

The mesomorphic polymer can have a ferroelectricity. Such a ferroelectric mesomorphic polymer may preferably show a chiral smectic phase such as SmC* (chiral smectic C) phase, SmH* phase, SmI* phase, SmJ* phase or SmG* phase. A ferroelectric mesomorphic polymer can provide a matrix showing a larger dielectric constant, whereby a larger effective voltage is applied to the low-molecular weight mesomorphic compound, thus providing the mesomorphic compound with a high-speed responsiveness.

Examples of the ferroelectric mesomorphic polymer may include those represented by the following structural formulas.

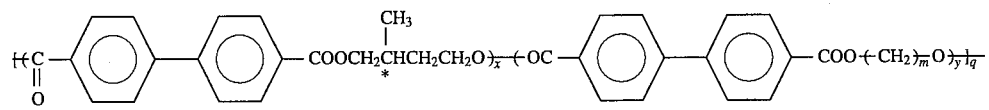
(22)

$x + y = 1, m = 4–12, q \geq 3$

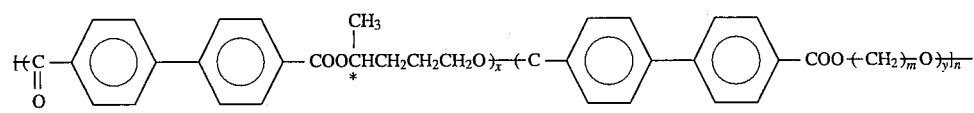
(23)

$x + 1 = 1, m = 4–12, n = 5–1000$

Other optically active mesomorphic polymers showing ferroelectricity when blended with a mesomorphic polymer of the present invention may also be used.

Specific examples of the optically active mesomorphic polymer may include those represented by the following structural formulas.

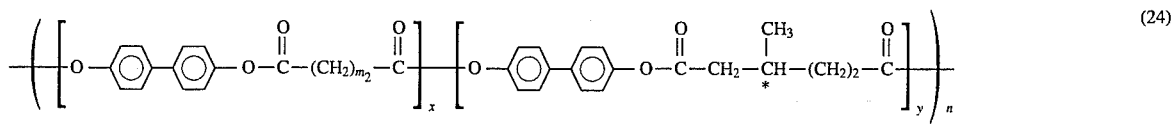
(24)

$(m_2 = 2\sim 15, x + y = 1)$

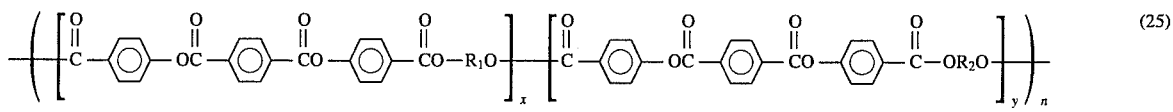
(25)

$R_1 = -CH_2CH_2\overset{CH_3}{\underset{*}{C}H}\!+\!CH_2\!+\!_{\overline{3}}$   $R_2 = +CH_2+_{\overline{m_2}}$   $(x + y = 1, m_2 = 2\sim 15)$

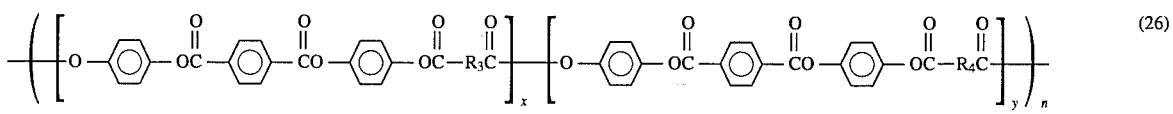
(26)

$R_3 = -CH_2\overset{CH_3}{\underset{*}{C}H}\!+\!CH_2\!+\!_{\overline{2}}$   $R_4 = +CH_2+_{\overline{m_2}}$   $(x + y = 1, m_2 = 2\sim 15)$

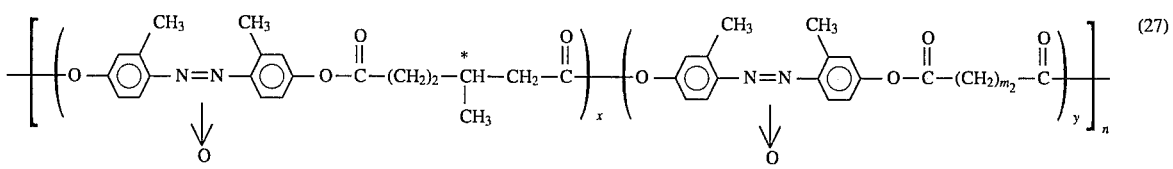
(27)

$(x + y = 1, m_2 = 2\sim 15)$

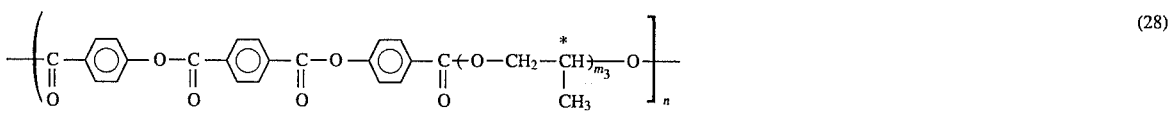
(28)

$(m_3 = 1\sim 5)$

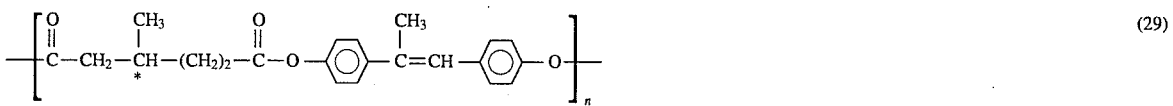
(29)

(30)

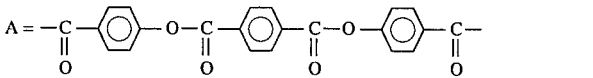

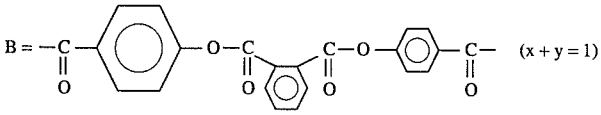   $(x + y = 1)$

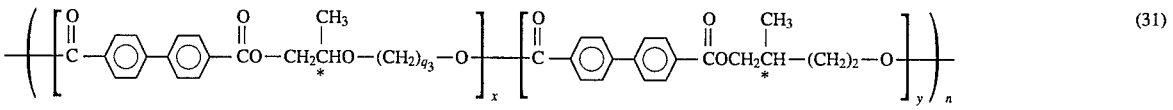
(31)

$(q_3 = 1\sim 10, x + y = 1)$

On the other hand, specific examples of the low-molecular weight mesomorphic compound of the present invention may include those represented by the following structural formulas, which are show below together with phase transition characteristics.

Herein, the respective symbols denote the following phases:

Cryst.: crystal,
SmC*: chiral smectic C phase,
SmA: smectic A phase,
SmB: smectic B phase,
SmC: smectic C phase,
SmE: smectic E phase, SmF: smectic F phase,
SmG: smectic G phase,
Sm3: un-identified smectic phase, Ch.: cholesteric phase,
N: nematic phase, and
Iso.: isotropic phase.

Chiral smectic mesomorphic compound

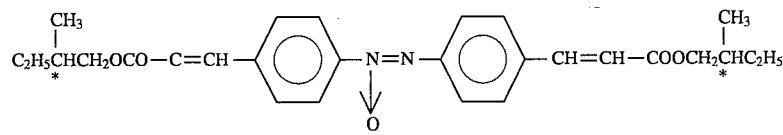                                                     (I-1)

4,4-azoxycinnamic acid-bis(2-methylbutyl)ester

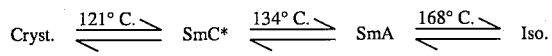

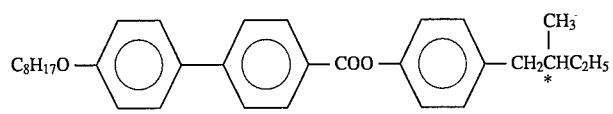                                                     (I-2)

4-(2'-methylbutyl)phenyl-4'-octyloxybiphenyl-4-carboxylate

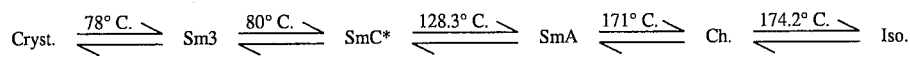

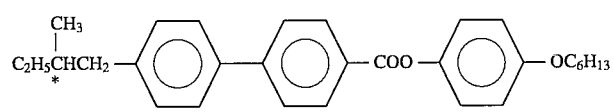                                                     (I-3)

4-hexyloxyphenyl-4-(2"-methylbutyl)biphenyl-4'-carboxylate

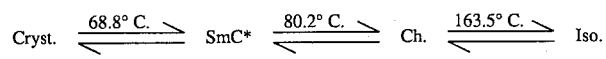

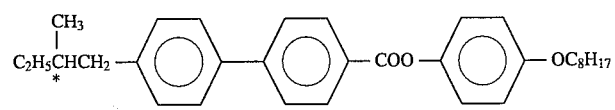                                                     (I-4)

4-octyloxyphenyl-4-(2"-methylbutyl)biphenyl-4'-carboxylate

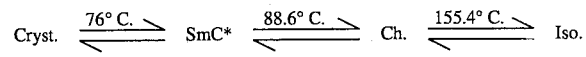

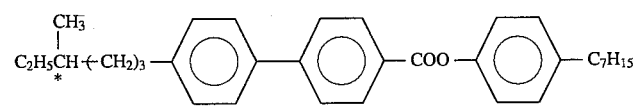                                                     (I-5)

4-heptylphenyl-4-(4"-methylhexyl)biphenyl-4'-carboxylate

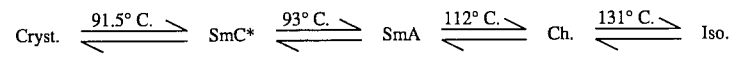

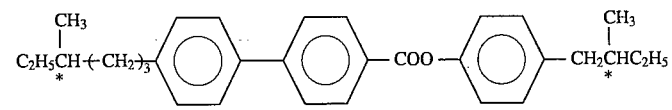                                                    (I-6)

4-(2"-methylbutyl)phenyl-4-(4"-methylhexyl)-biphenyl-4'-carboxylate

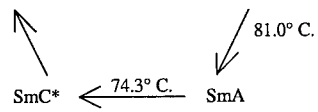

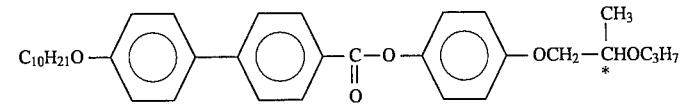                                                    (I-7)

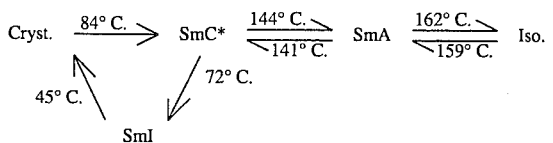
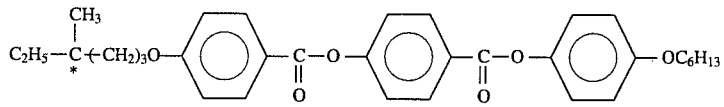
(I-8)
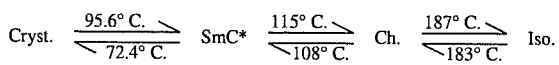
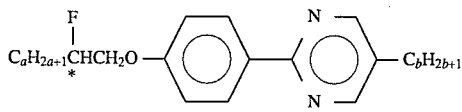
(I-9)
a = 4–12,
b = 8–16
(Case where a = 6, b = 12)
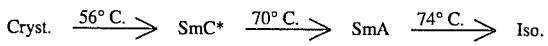
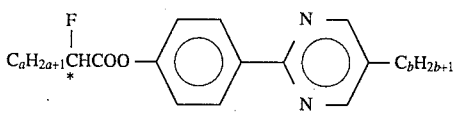
(I-10)
a = 4–12,
b = 8–16
(Case where a = 8, b = 10)
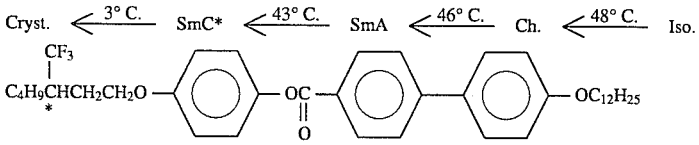
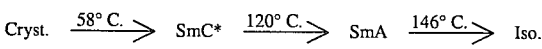
(I-11)
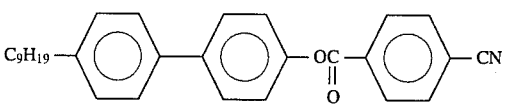
Non-chiral smectic mesomorphic compound
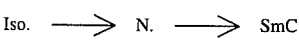
(I-12)
4'-n-nonyloxy-4-biphenylyl-4-cyanobenzoate
Iso. ⟶ N. ⟶ SmC
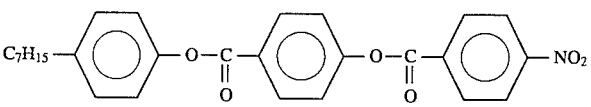
(I-13)
4-n-heptylphenyl-4-(4'-nitrobenzoyloxy)benzoate
Iso. ⟶ N. ⟶ SmA
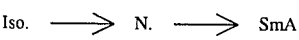
(I-14)
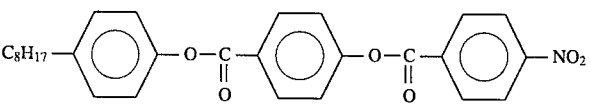
4-n-octylphenyl-4-(4'-nitrobenzoyloxy)benzoate Iso. ⟶ N. ⟶ SmA ⟶ SmC

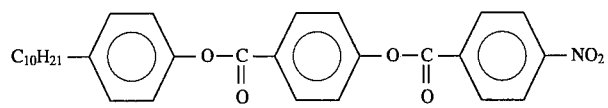  (I-15)

4-n-decylphenyl-4-(4'-nitrobenzoyloxy)benzoate

Iso. ⟶ N. ⟶ SmA ⟶ SmC

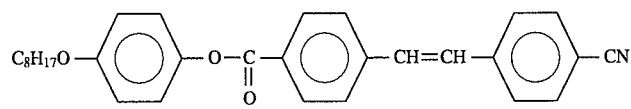  (I-16)

trans-4-(4''-octyloxybenzoyloxy)-4'-cyanostilbene

Iso. ⟶ SmA₁ ⟶ N. ⟶ SmA₂

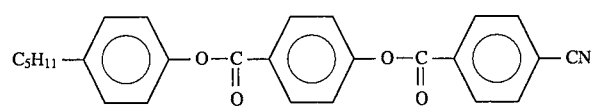  (I-17)

4-n-pentylphenyl-4-(4'-cyanobenzoyloxy)benzoate

Iso. ⟶ N. ⟶ SmA

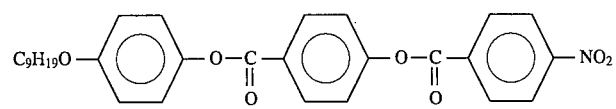  (I-18)

4-n-nonyloxyphenyl-4-(4'-nitrogenzoyloxy)benzoate

Iso. ⟶ N. ⟶ SmA ⟶ SmC

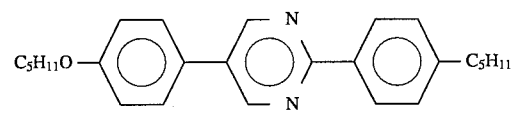  (I-19)

2-(4'-n-pentylphenyl)-5-(4''-n-pentyloxyphenyl)-pyrimidine

Iso. ⟶ SmA ⟶ SmC ⟶ SmF ⟶ SmG

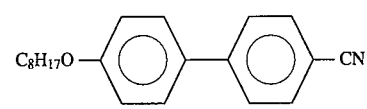  (I-20)

4-cyano-4'-n-octyloxybiphenyl

Iso. ⟶ N. ⟶ SmA

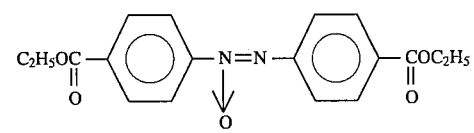  (I-21)

diethyl p,p'-azoxydibenzoate

Iso. ⟶ SmA

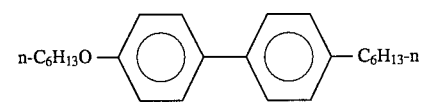  (I-22)

4-n-hexyl-4'-n-hexyloxybiphenyl

Iso. ⟶ SmB ⟶ SmE

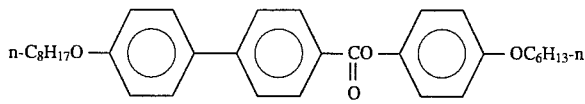 (I-23)

4-n-hexyloxyphenyl-4'-n-octyloxybiphenyl-4-carboxylate

Iso. ⟶ N. ⟶ SmA ⟶ SmC ⟶ SmB

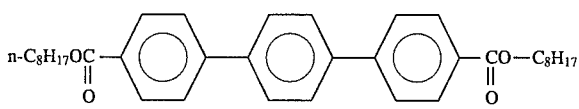 (I-24)

di-n-octyl-4,4''-terphenyl dicarboxylate

Iso. ⟶ SmA ⟶ SmC

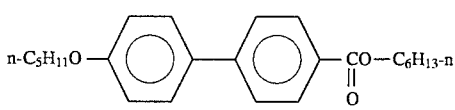 (I-25)

n-hexyl-4'-n-pentyloxybiphenyl-4-carboxylate

Iso. ⟶ SmA ⟶ SmB ⟶ SmE

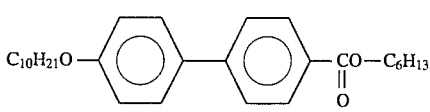 (I-26)

4-n-hexyl-4'-n-decyloxybiphenyl-4-carboxylate

Iso. ⟶ SmA ⟶ SmC

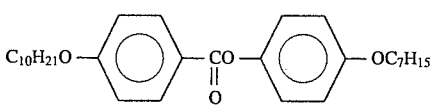 (I-27)

4-n-heptyloxylphenyl-4-n-decyloxybenzoate

Iso. ⟶ SmA ⟶ SmC

Nematic mesomorphic compound (or nematic liquid crystal)

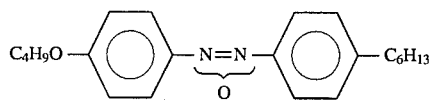 (I-28)

4-hexyl-4'-butyloxyazobenzene

Iso. ⟵90° C.⟶ N. ⟵27° C.⟶ Cryst.

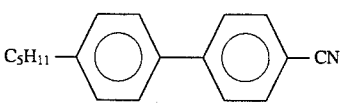 (I-29)

4-cyano-4'-pentylbiphenyl

Iso. ⟵35° C.⟶ N. ⟵24° C.⟶ Cryst.

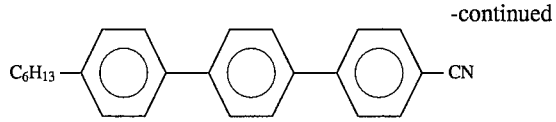

4-cyano-4'-hexylterphenyl

Iso. $\xrightarrow{228°\,C.}$ N. $\xrightarrow{125°\,C.}$ Cryst.

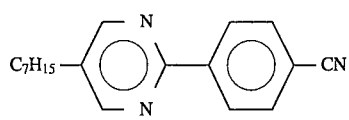

heptylcyanophenyl pyrimidine

Iso. $\xrightarrow{50°\,C.}$ N. $\xrightarrow{44°\,C.}$ Cryst.

Z-1625 (mfd. by Merck Co.)  (I-32)
Nematic temperature range = −10° to 60° C.

E-7 (mfd. by BDH Co.)  (I-33)
Nematic temperature range = −10° to 60° C.

R-200 (mfd. by Rosch Co.)  (I-34)
Nematic temperature range = 0° to 65° C.

D-X01A (mfd. by Dainippon Ink K.K.)  (I-35)
Nematic temperature range = −26° to 68° C.

ZLI-2008 (mfd. by Merck Co.)  (I-36)
$T_{cl}$ (clearing point) = 64° C.

Sm $\xrightarrow{<-20°\,C.}$ N

ZLI-1840 (mfd. by Merck Co.)  (I-37)
$T_{cl}$ = 90° C.

Sm $\xrightarrow{<-20°\,C.}$ N

TN403 (mfd. by Dainippon Ink K.K.)  (I-38)
$T_{cl}$ = 82° C.

Sm $\xrightarrow{<-20°\,C.}$ N (I-30)

(I-31)

The display layer according to the first aspect of the present invention comprises a mesomorphic polymer and a low-molecular weight mesomorphic compound as described above. In this mixture system, it is possible to obtain a good alignment characteristic by using not only the above-mentioned alignment control layer but also the following aligning methods. The aligning methods for aligning the molecules of the display layer may include stretching methods such as uniaxial stretching, biaxial stretching and inflation stretching, and shearing so as to effect realignment of the molecules. When the above aligning method is employed, it is unnecessary to form the alignment control layer on the electrode plate in some cases.

According to the second aspect of the present invention, the display layer comprises a mesomorphic polymer and a low-molecular weight mesomorphic compound, wherein the mesomorphic polymer has been formed through polymerization of a composition comprising a polymerizable mesomorphic monomer and the low-molecular weight mesomorphic compound when the composition is in its mesomorphic state.

In this embodiment, referring to FIG. 1, a mesomorphic polymer 105 obtained from a polymerizable mesomorphic monomer becomes in compatible with a low-molecular weight mesomorphic compound 104 after polymerization. The in-compatibility of the mesomorphic polymer 105 with the mesomorphic compound 104 is recognized by means of the above-mentioned DSC and polarizing microscope.

The dispersed state of the low-molecular weight mesomorphic compound and the content of the mesomorphic polymer in the display layer are the same as described above with respect to the first aspect.

It is possible to use a crosslinking monomer in combination with the polymerizable mesomorphic monomer so as to provide a mesomorphic polymer having a in-compatibility with the low-molecular weight mesomorphic compound. In this instance, the crosslinking monomer is copolymerized with the polymerizable mesomorphic monomer to form a mesomorphic polymer having three-dimensional crosslinking structure.

In the second aspect of the present invention, the polymerizable mesomorphic monomer may have one or more polymerizable groups. The polymerizable group may include the following groups:

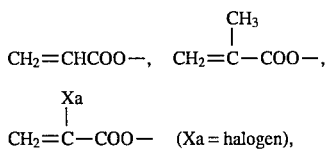

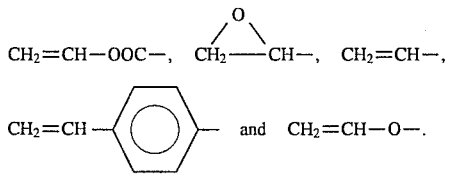

The polymerizable mesomorphic monomer having one polymerizable group may be represented by the following formula:

X—Y—M—Z    (II-a), wherein X denotes a polymerizable group; Y denotes a flexible spacer (or a flexible chain group); M denotes a mesogen group (or a mesogen unit); and Z denotes a terminal (or end) group.

Specific example of the polymerizable group X may include those described above.

Specific examples of the flexible spacer Y may include those listed below:

—(CH$_2$)$_n$— (n=0–15),
—CH$_2$CH$_2$—O)$_n$— (n=1–4),

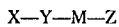

—(CH$_2$CH$_2$CH$_2$CH$_2$O)$_n$—(n=1–3),
—(CH$_2$CH$_2$CH$_2$O)$_n$—(n=1–4), and
—(CH$_2$)n—O—(n=0–15).

Specific examples of the mesogen group M may include the following group:

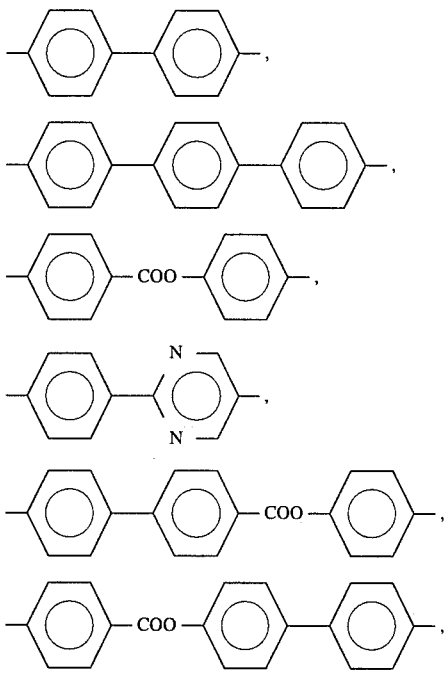

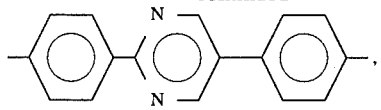

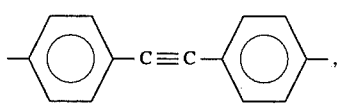

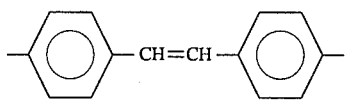

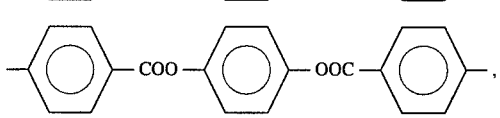

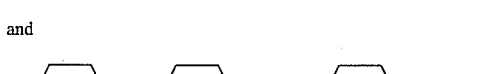

and

One or more hydrogen atoms in the mesogen group M can be optionally substituted with one or more terminal groups described below.

Specific examples of the terminal group Z may include those enumerated below:

—CN, —C$_n$H$_{2n+1}$ (n=1–10), —H,
—OC$_n$H$_{2n+1}$ (n=1–10), —CF$_3$, —Cl, —F,
-C$_n$F$_{2n+1}$ (n=1–10), —NO$_2$ and
—COO—(CH$_2$)$_{n1}$OC$_{n2}$H$_{2n2+1}$ (n1, n2=1–10).

Then, the polymerizable mesomorphic monomer having at least two polymerizable group may, e.g., be represented by the following formula:

X$_1$—Y$_1$—M$_1$—Y$_2$—X$_2$    (II-b), wherein X$_1$ and X$_2$ independently denote the same as the above-mentioned polymerizable group X; Y$_1$ and Y$_2$ independently denote the same as the above-mentioned flexible spacer Y; and M$_1$ denote the same as the above-mentioned mesogen group M.

In the second aspect of the present invention, the polymerizable mesomorphic monomer may be used singly or in combination of two or more species, more preferably in combination of two or ore species containing at least one polymerizable mesomorphic monomer having at least two polymerizable groups.

The polymerizable mesomorphic monomer may include a polymerizable monomer which can show mesomorphism only after its polymerization.

Specific examples of the polymerizable mesomorphic monomer represented by the formula (II-a) or (II-b) may include those represented by the following structural formulas.

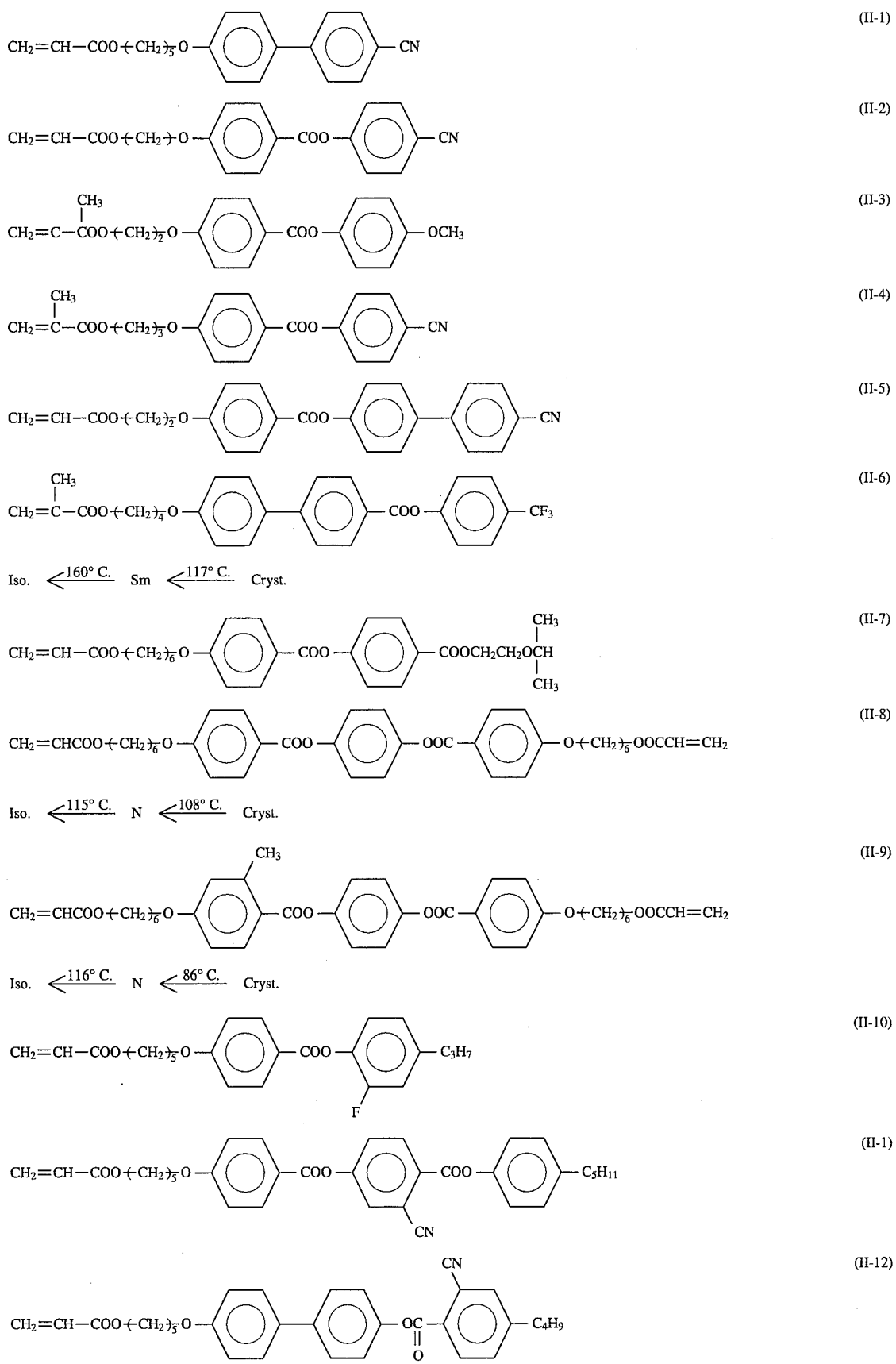

-continued
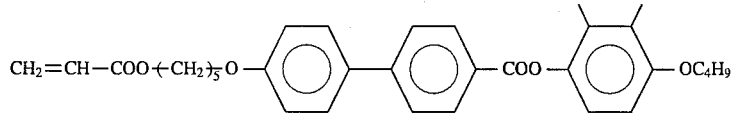 (II-13)
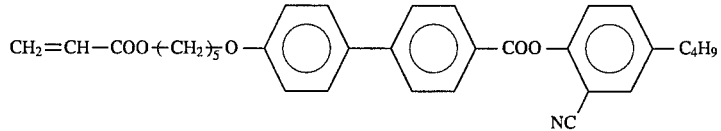 (II-14)
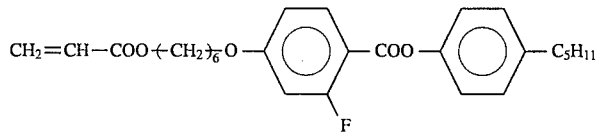 (II-15)
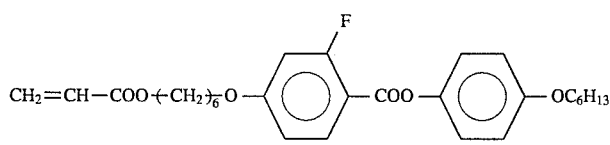 (II-16)
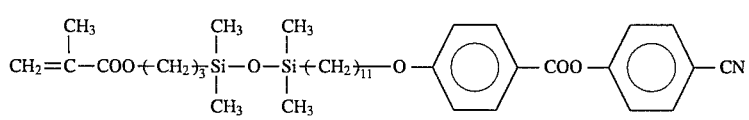 (II-17)
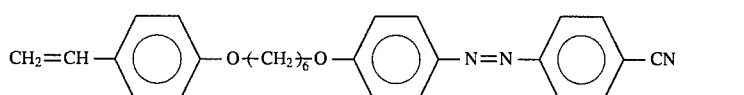 (II-18)
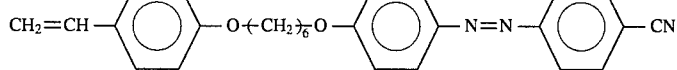 (II-19)
 (II-20)
 (II-21)
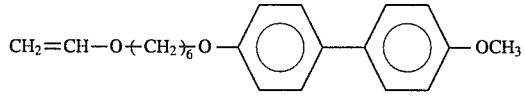 (II-22)
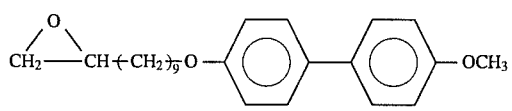 (II-23)
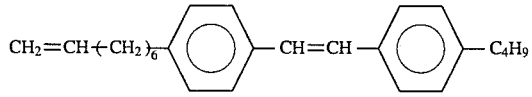 (II-24)
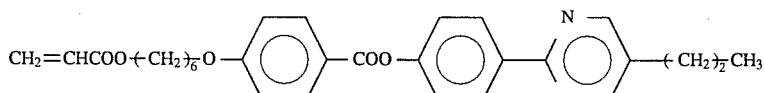 (II-25)
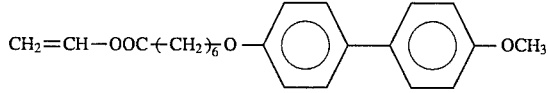
The polymerizable mesomorphic monomer may be polymerized by various polymerization methods using a polymerization initiator.
The polymerization methods may include radical polymerization, anionic polymerization, cationic polymerization, ring-opening polymerization, and transfer polymerization, wherein these polymerization is initiated by heating or exposure to light.

The polymerization initiator is used in proportion of 0.05–10 wt. %, preferably 0.1–5 wt. %, of the composition comprising the polymerizable mesomorphic monomer and the low-molecular weight mesomorphic compound. Below 0.05 wt. %, the mesomorphic monomer cannot be sufficient polymerized, thus failing to provide a good mesomorphic polymer. Above 10 wt. %, a decomposition product of the polymerization initiator or the polymerization initiator per se can adversely affect the mesomorphism of the resultant polymer, thus leading to a narrower mesomorphic temperature range. The polymerization initiator may be of benzoin ether-type, benzophenone-type, acetophenene-type or thioxanthone-type.

Specific examples of the polymerization initiator may include those represented by the following structural formulas or trade names.

Acylphosphinoxide

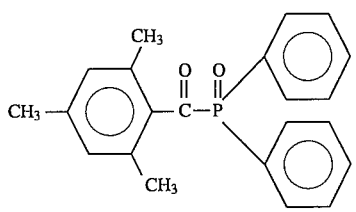
(III-1)

Michler's ketone

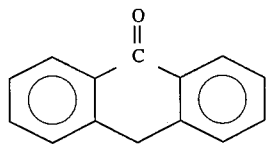
(III-2)

Isobutylthioxanthone

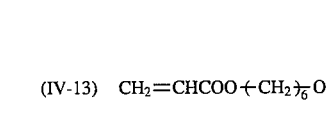

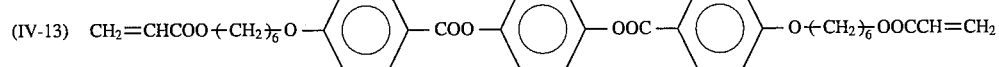
(IV-13) $CH_2=CHCOO+CH_2\frac{}{6}O-\langle\bigcirc\rangle-COO-\langle\bigcirc\rangle-OOC-\langle\bigcirc\rangle-O+CH_2\frac{}{6}OOCCH=CH_2$ -continued

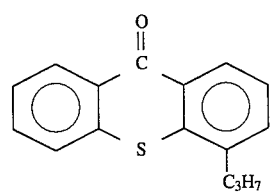
(III-3)

Darocur 1173 (mfd. by Merk Japan K.K.)

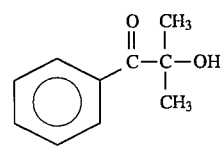
(III-4)

Irgacure 184 (mfd. by Ciba-Geigy Corp.)

-continued

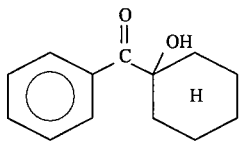
(III-5)

(III-6)
Irgacure 907 (mfd. by Ciga-Geigy Corp.)
(III-7)
Irgacure 651 (mfd. by Ciga-Geigy Corp.)
(III-8)
Vicure 55 (mfd. by Stuaffer Chemical Co.)

The polymerization initiator may be used together with a polymerization promoter (or accelerator) or a sensitizer.

The composition comprising the polymerizable mesomorphic monomer and the low-molecular weight mesomorphic compound may further contain a polymerizable oligomer or a crosslinking monomer as long as the composition shows mesomorphism.

Specific examples of the polymerizable oligomer or the crosslinking monomer may include those listed below:

(IV-1) trimethylolpropane triacrylate (IV-2) pentaerythritol triacrylate (IV-3) tripropylene glycol diacrylate (IV-4) 1,6-hexanediol diacrylate (IV-5) bisphenol A diglycidyl ether diacrylate (IV-6) tetraethylene glycol diacrylate (IV-7) hydroxypivalic acid neopentyl glycol diacrylate (IV-8) pentaerythritol tetraacrylate (IV-9) dipentaerythritol hexaacrylate (IV-10) glycidyl acrylate (IV-11) heptadecachlorodecyl acrylate (IV-12) -methacryloxypropyl trimethoxysilane (IV-14) Aronix M-6100 (mfd. by Toa Gosei K. K.)

(IV-15) Aronix M-8060 (mfd. by Toa Gosei K. K.)

(IV-16) Aronix M-1200 (mfd. by Toa Gosei K. K.)

(IV-17) Biscoat 700 (mfd. by Osaka Yunki K. K.)

(IV-18) Ebecryl 438 (mfd. by VCB Chemical K. K.)

(IV-19) Ripoxy SP-1506 (mfd. by Showa Kobunshi K. K.)

(IV-20) Art resin UN-2500 (mfd. by Negami Kogyo K. K.)

In the present invention, the display layer may preferably comprise a mesomorphic polymer having a negative dielectric anisotropy derived from the polymerizable mesomorphic monomer and a low-molecular weight mesomorphic compound having a positive dielectric anisotropy.

Specifically, when the liquid crystal device containing the above display layer is supplied with a driving voltage due to an external electric field even a part of the mesomorphic polymer adjacent to the interface between the mesomorphic polymer and the low-molecular weight mesomorphic compound does not change its alignment direction, accompanying the response of the low-molecular weight mesomorphic compound to an applied voltage. This may be attributable to the fact that the positive dielectric anisotropy of the low-molecular weight mesomorphic compound is weakened by or counterbalanced with the negative dielectric anisotropy of mesomorphic polymer. As a result, it is possible to prevent a hysteresis phenomenon in light transmittance when the applied voltage is increased or decreased. In this regard, the mesomorphic polymer may preferably have a dielectric anisotropy $\Delta\epsilon$ of $-3.0$ or below in particular. The display device containing such a display layer comprising a mesomorphic polymer having a dielectric anisotropy $\Delta\epsilon$ or $-3.0$ or below and a low-molecular weight mesomorphic compound can effect a precise gradation display by voltage control.

Herein, measurement of the dielectric anisotropy $\Delta\epsilon$ can be conducted according to a known method (e.g., as disclosed by Koji Okano and Shunsuke Kobayashi, "Ekisho (Fundamental)", pp. 215–220 (1985) published from K. K. Baifu Kan). More specifically, the dielectric anisotropy $\Delta\epsilon$ of the low-molecular weight mesomorphic compound and the polymerizable monomer may be measured by the following method.

Into a blank cell (cell gap=10 microns, electrode=2000 Å-thick Cr or ITO, electrode area=1 cm$_2$), a sample is injected, followed by measurement of capacitance by means of an LCR meter (LF Impedance Analyzer 4192A, available from Hewelett Packard Co.) to calculate permittivity (or dielectric constant) $\epsilon$. In this instance, a permittivity $\epsilon\|$ is obtained by using a blank cell treated with a silane coupling agent (AY-43-0210, available from Toray Silicone K. K.), and a permittivity $\epsilon\perp$ is obtained by using a blank cell formed by using a polyimide alignment film (HL-1110, available from Hitachi Kasei Kogyo K. K.) subjected to rubbing treatment.

The dielectric anisotropy $\Delta\epsilon$ is obtained by the following equation:

$$\Delta\epsilon = \epsilon\| - \epsilon\perp.$$

When the polymerizable mesomorphic monomer per se does not show mesomorphism, it is possible to obtain the dielectric anisotropy $\Delta\epsilon$ by using mixtures of the monomer and a low-molecular weight mesomorphic compound having a known dielectric anisotropy in some mixing ratios and extrapolating the measured values to the monomer per se.

The extrapolation can also be applied to the mesomorphic polymer when the dielectric anisotropy of the mesomorphic polymer cannot be measured alone.

The dielectric anisotropy $\Delta\epsilon$ of a mesomorphic polymer may be measured in the same manner as in the above method. In case of using a mesomorphic polymer derived from a polymerizable mesomorphic monomer, a sample cell may be prepared as follows.

In a blank cell, 10 wt. parts of a sample polymerizable mesomorphic monomer and 0.3 wt. part of a polymerization initiator (Irgacure 651, available from Ciba-Geigy Corp.) are injected. Under a mesomorphic state, the mixture is exposed to a high pressure mercury lamp (power=40 W) to effect polymerization, thus providing a sample cell containing the mesomorphic polymer derived from the polymerizable mesomorphic monomer.

The polarity of the dielectric anisotropy can easily be judged by the following manner.

A sample cell containing a mesomorphic polymer as mentioned above is subjected to pulse voltage application (rectangular wave from of ±50 V and 60 Hz). Light transmittance of the sample cell before and after a pulse voltage application is measured by means of a polarizing microscope with cross-nicol relationship at a mesomorphic temperature higher than the glass transition temperature Tg of the mesomorphic polymer used. As a result, when the light transmittance of the sample cell is decreased after the voltage application, the polarity of dielectric anisotropy $\Delta\epsilon$ is judged to be positive. When the light transmittance is not changed after the voltage application, the polarity of dielectric anisotropy $\Delta\epsilon$ is judged to be negative.

In the above-mentioned specific examples of the low-molecular weight mesomorphic compounds, the compounds No. (I-1) to (I-20), (I-25), and (I-29) to (I-35) have positive dielectric anisotropies (+$\Delta\epsilon$).

In the above-mentioned specific examples of the polymerizable mesomorphic monomer, the monomers No. (II-3) and (II-7) to (II-16) have negative dielectric anisotropies ($-\Delta\epsilon$). The dielectric anisotropy $\Delta\epsilon$ of the polymerizable mesomorphic monomer used in the present invention may preferably be $-1.0$ or below (i.e., an absolute value of at least 1.0), more preferably $-2.0$ or below, further preferably $-3.0$ or below. Above $-1.0$, a low-molecular weight mesomorphic compound having a small positive dielectric anisotropy can only be used because molecules of the resultant mesomorphic polymer derived from the polymerizable mesomorphic monomer respond to an applied electric field under the influence of the response of the low-molecular weight mesomorphic compound if the low-molecular weight mesomorphic compound has a large positive dielectric anisotropy which is larger in absolute value than the small negative dielectric anisotropy of the resultant mesomorphic polymer. As a result, the response speed of the liquid crystal device containing such materials is decreased and the threshold voltage for driving is required to be undesirably increased.

In order to provide a practical liquid crystal device free from drawbacks described above, the mesomorphic polymer including one derived from the polymerizable mesomorphic monomer may preferably have an dielectric anisotropy of $-3.0$ or below.

Figure 2A:
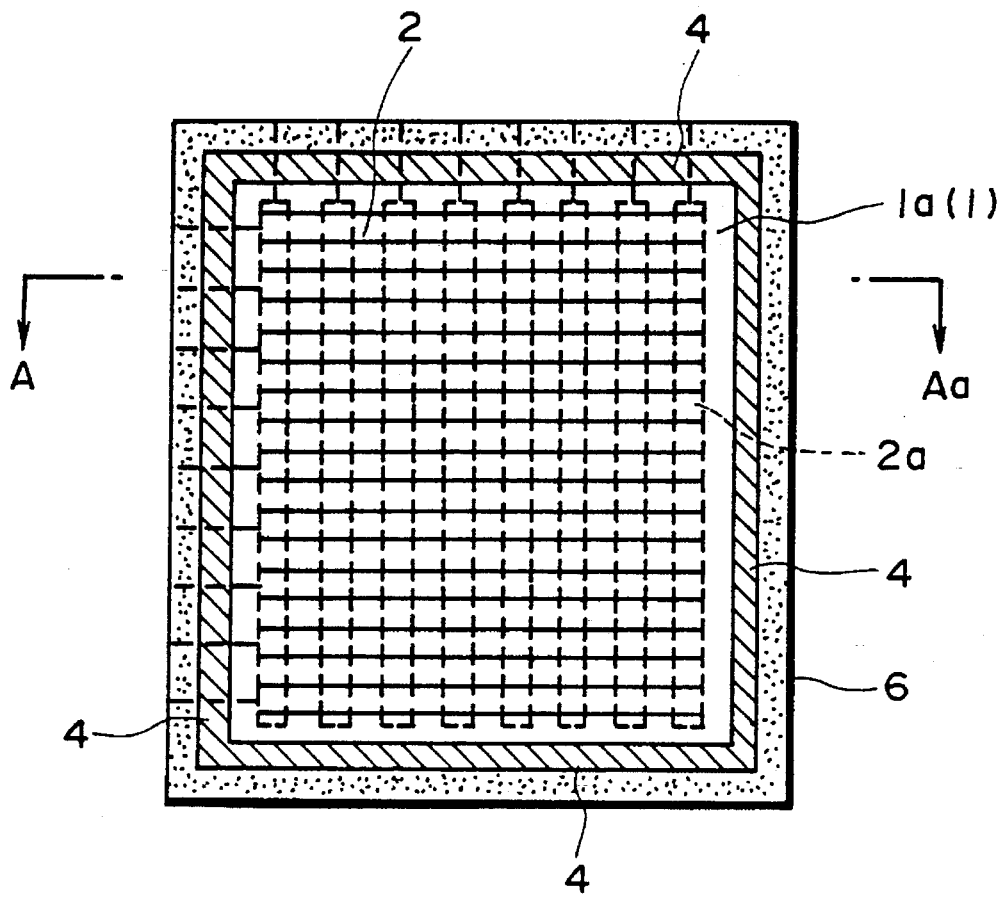
FIG. 2A is a schematic plan view of a liquid crystal device of the present invention.
Figure 2B:
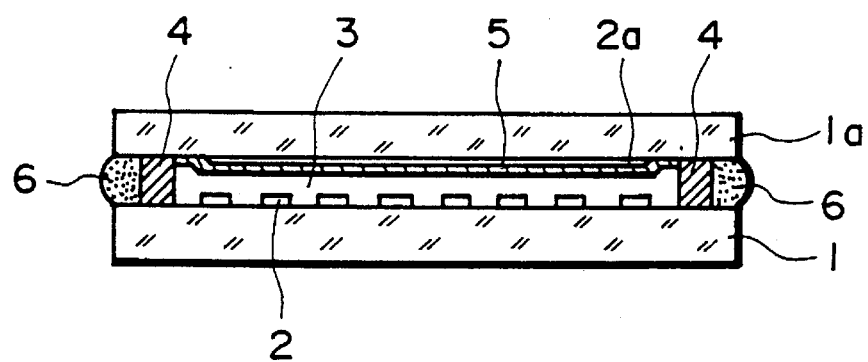
FIG. 2B is schematic A–Aa line-sectional view of the device shown in FIG. 2A.

FIGS. 2A and 2B show another structural embodiment of the liquid crystal device of the present invention, wherein FIG. 2A is a schematic plan view of the device and FIG. 2B is a schematic A-Aa line-sectional view of the device.

Referring to FIGS. 2A and 2B, the liquid crystal device of the present invention includes a pair of substrates 1 and 1a (at least one of which can have birefringence or be used in combination with a polarizer) comprising a glass plate or a plastic plate and held to have a prescribed (but arbitrary) gap with a spacer 4. The periphery of the substrates 1 and 1a is sealed up with an adhesive 6 such as an epoxy resin. On the substrate 1a, plural transparent electrodes 2a (e.g., electrodes for applying scanning voltage) with a prescribed pattern, e.g., in the form of stripes, are formed. On the other hand, plural transparent electrodes 2 (e.g., electrodes for applying signal voltage) with a reflection layer perpendicular to the electrodes 2a are formed on the substrate 1.

Referring to FIG. 2B, a display layer 3 is disposed between the substrates 1 and 1a having the transparent electrodes 2 and 2a, respectively, thereon. In this embodiment, an alignment control layer 5 is formed on the transparent electrode 2.

The display apparatus of the present invention includes the above-mentioned liquid crystal device, means for emitting light, means for applying voltage to the device, and means for separating the light into transmitted light and scattered light.

Figure 3:
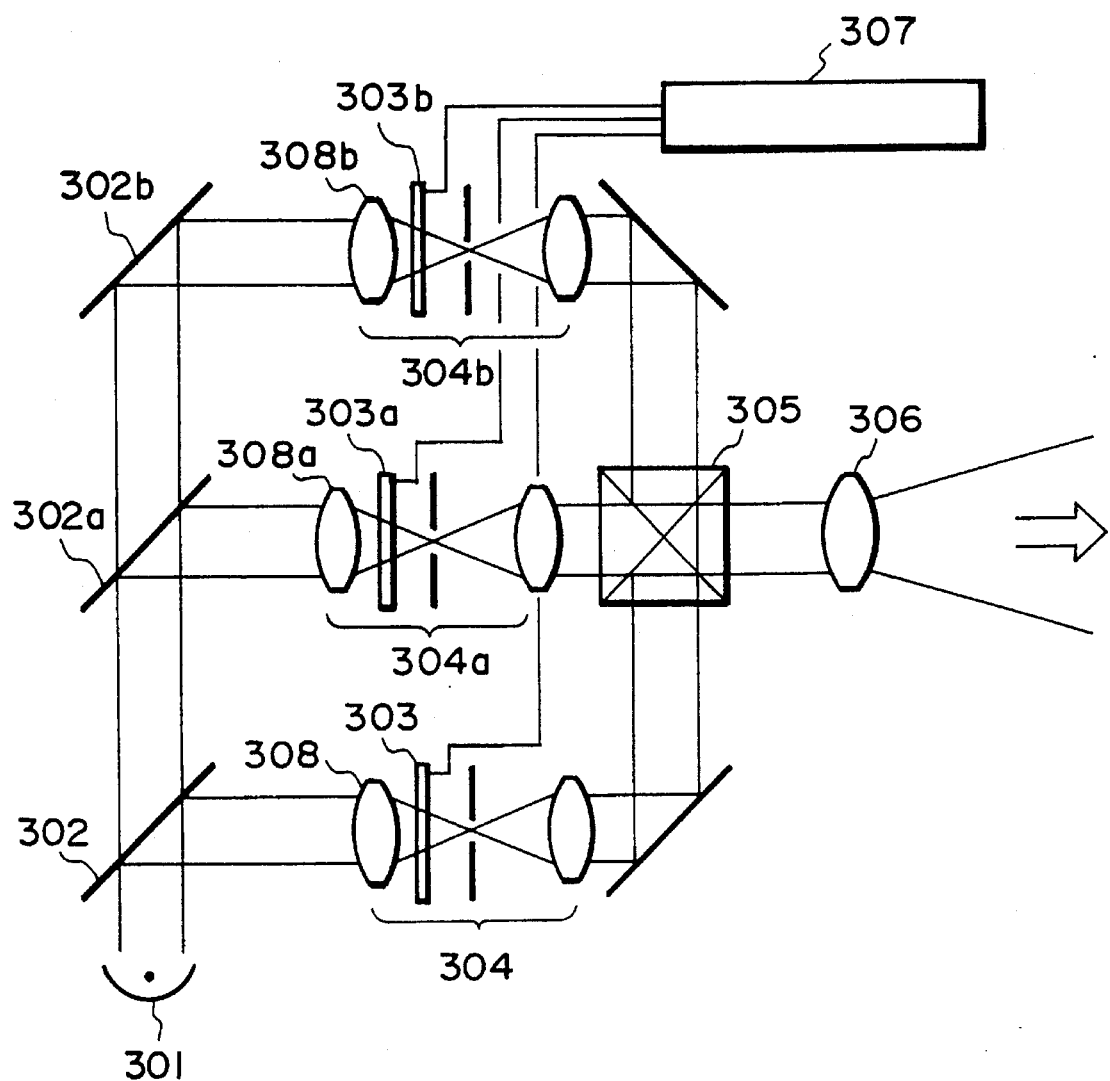
FIG. 3 is an explanatory view of a display apparatus employing a liquid crystal device according to the present invention.

FIG. 3 shows an explanatory view of an embodiment of the display apparatus of the present invention. The display apparatus is a full-color projection-type display apparatus employing a schlieren optical system.

Referring to FIG. 3, white light emitted by a light source unit 301 is separated into three primary colors of R (red), G (green) and B (blue) to be incident to liquid crystal devices 303, 303a and 303b after passing through schlieren lenses 308, 308a and 308b. At this time, the liquid crystal devices 303, 303a and 303b are supplied with voltage by a driving unit 307 for driving the liquid crystal devices. The liquid crystal devices in this embodiment can employ a simple matrix system or a non-linear optical device, but may more preferably be a type comprising a thin film transistor (TFT) as a switch for each picture element in view of display contrast, response speed and gradation display. A selected picture element in the device is turned into a scattering state for scattering the incident light and a non-selected picture element is allowed to transmit the incident light. When the transmitted light fluxes and the scattered light fluxes are separated by schlieren optical systems 304, 304a and 304b, it is possible to obtain a good display having a contrast as high as 100. The transmitted light fluxes are combined by a dichloic prism 305 to be projected onto a screen (not shown) through a projection lens 306, whereby good full-color images can be obtained.

The display device of the present invention is illuminated with light, so that display is effected by employing the resultant scattered light. More specifically, an electric field is applied to the display layer in the liquid crystal device, whereby the low-molecular weight mesomorphic compound responds to the electric field to show a refractive index which is different from that in the absence of the electric field, thus giving a larger (or smaller) difference in refractive index with that of the mesomorphic polymer matrix, respectively with respect to the incident light, thereby to provide a difference scattering degree of the incident light before and under the electric field application. The display method of the present invention utilizes the difference in scattering degree of the scattered light for effecting display.

Hereinbelow, the present invention will be explained in more detail with reference to Examples.

EXAMPLE 1

A polymerizable mesomorphic monomer (Example Compound No. II-6) was synthesized by a method disclosed in "Makromol Chem.", Macromol Syrup 24, 283 (1989) by C. Noëet al.

Figure 6:
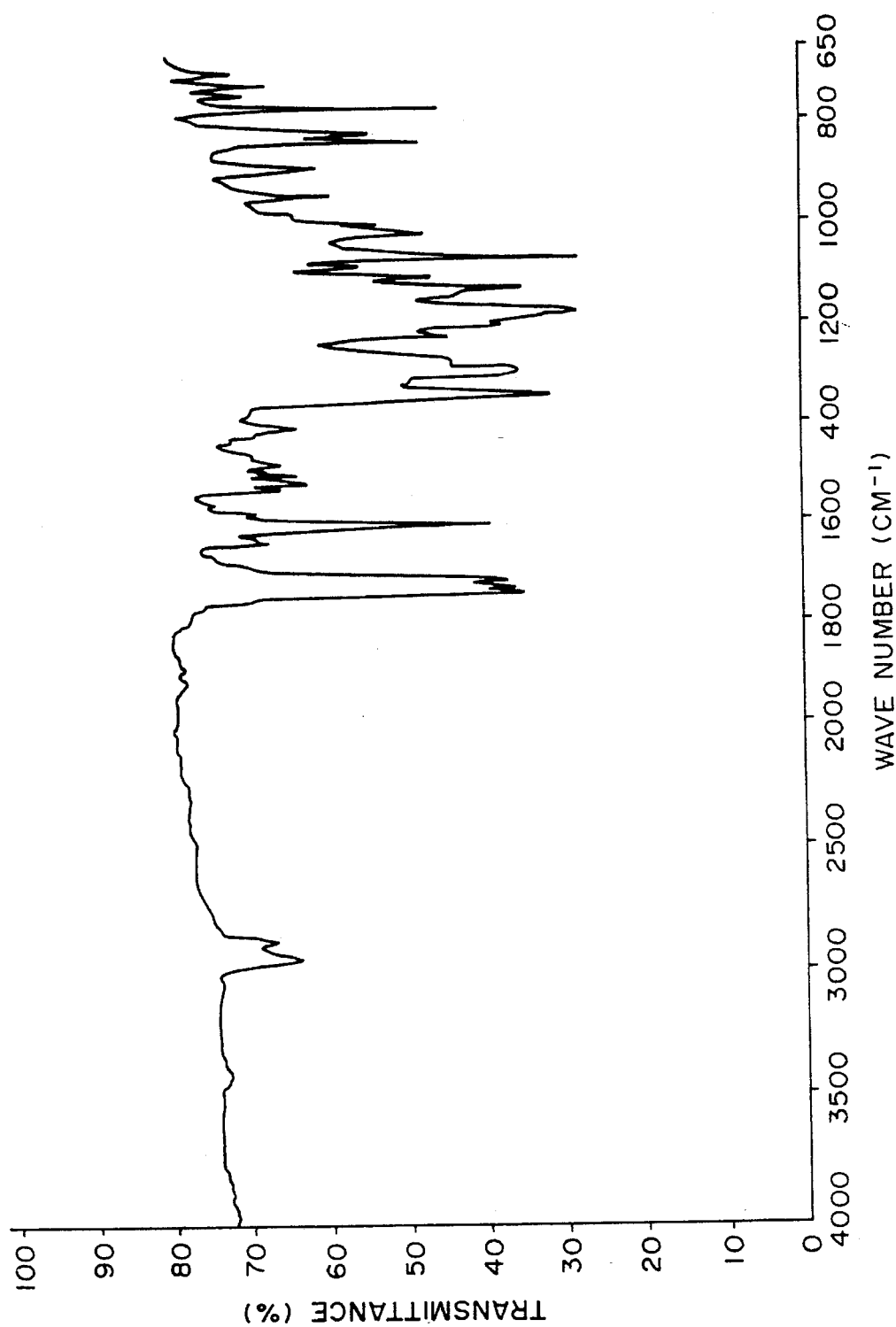
FIG. 6 is an IR (infrared) chart of the polymerizable mesomorphic monomer (II-6) used in Example 1.

The IR chart of the polymerizable mesomorphic monomer (II-6) is shown in FIG. 6.

Further, the polymerizable mesomorphic monomer showed the following phase transition series as measured by a differential scanning calorimeter (DSC).

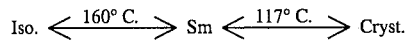

Figure 4:
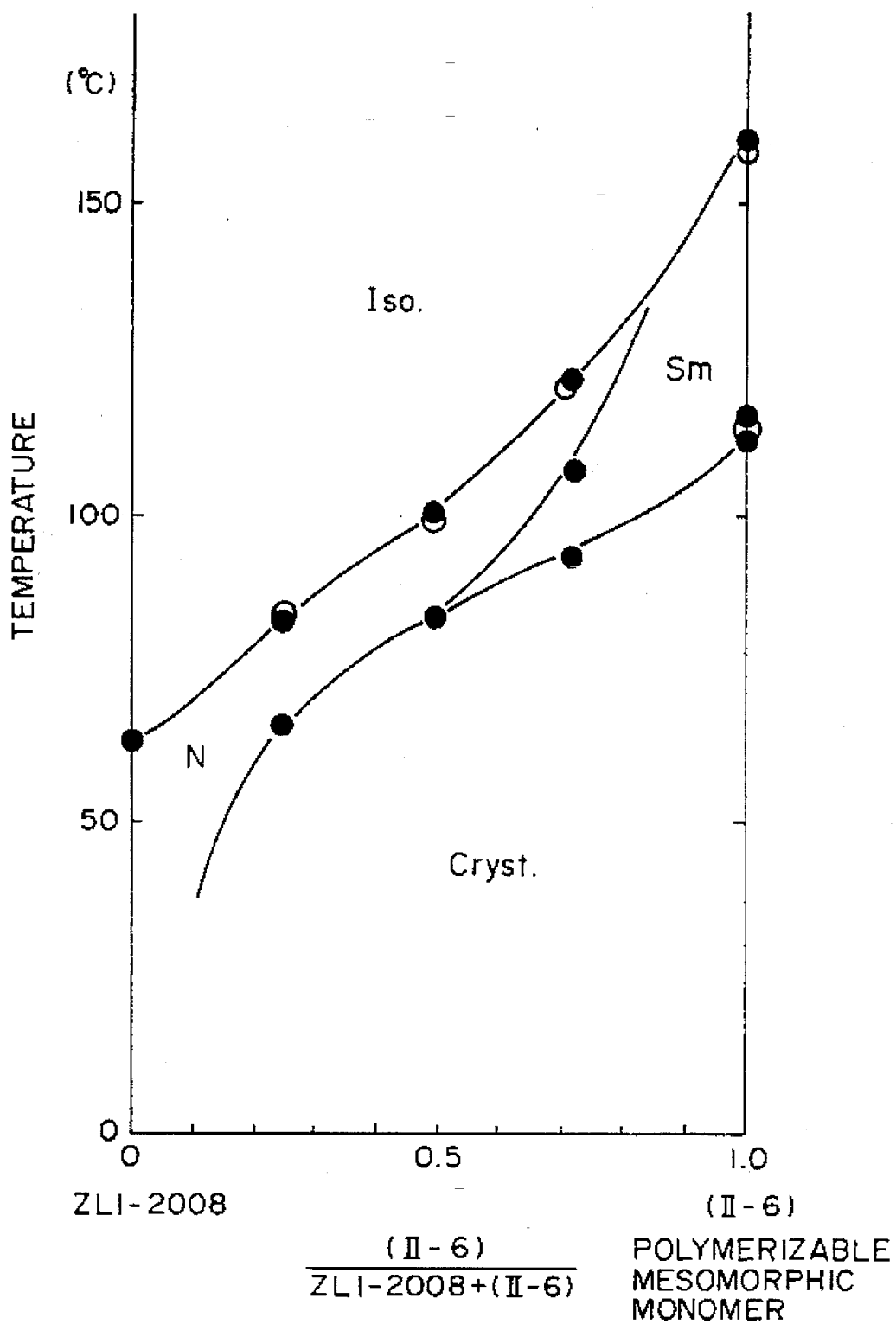
FIG. 4 is a phase diagram showing compatibility of the polymerizable mesomorphic monomer (II-6) with the low-molecular weight mesomorphic compound (ZLI-2008) used in Example 1.

The compatibility of the above-prepared polymerizable mesomorphic monomer (II-6) ($\Delta\epsilon>0$, $n_e$ (extraordinary index)=1.67, $n_o$ (ordinary index)=1.53) with a low-molecular weight negative liquid crystal (I-36) (trade name ZLI-2008, available from Merck & Co., Inc.; $\Delta\epsilon=+16$, $n_e=1.71$, $n_o=1.52$) was examined by the DSC and a polarizing microscope, whereby a phase diagram shown in FIG. 4 was obtained.

EXAMPLE 2

A polymerizable mesomorphic monomer (II-8) was sythesized by a method disclosed in "Macromol. Chem.", 190, 3201 (1989) by D. J. Broer, R. A. M. Hikmet and Ger Challa.

Figure 7:
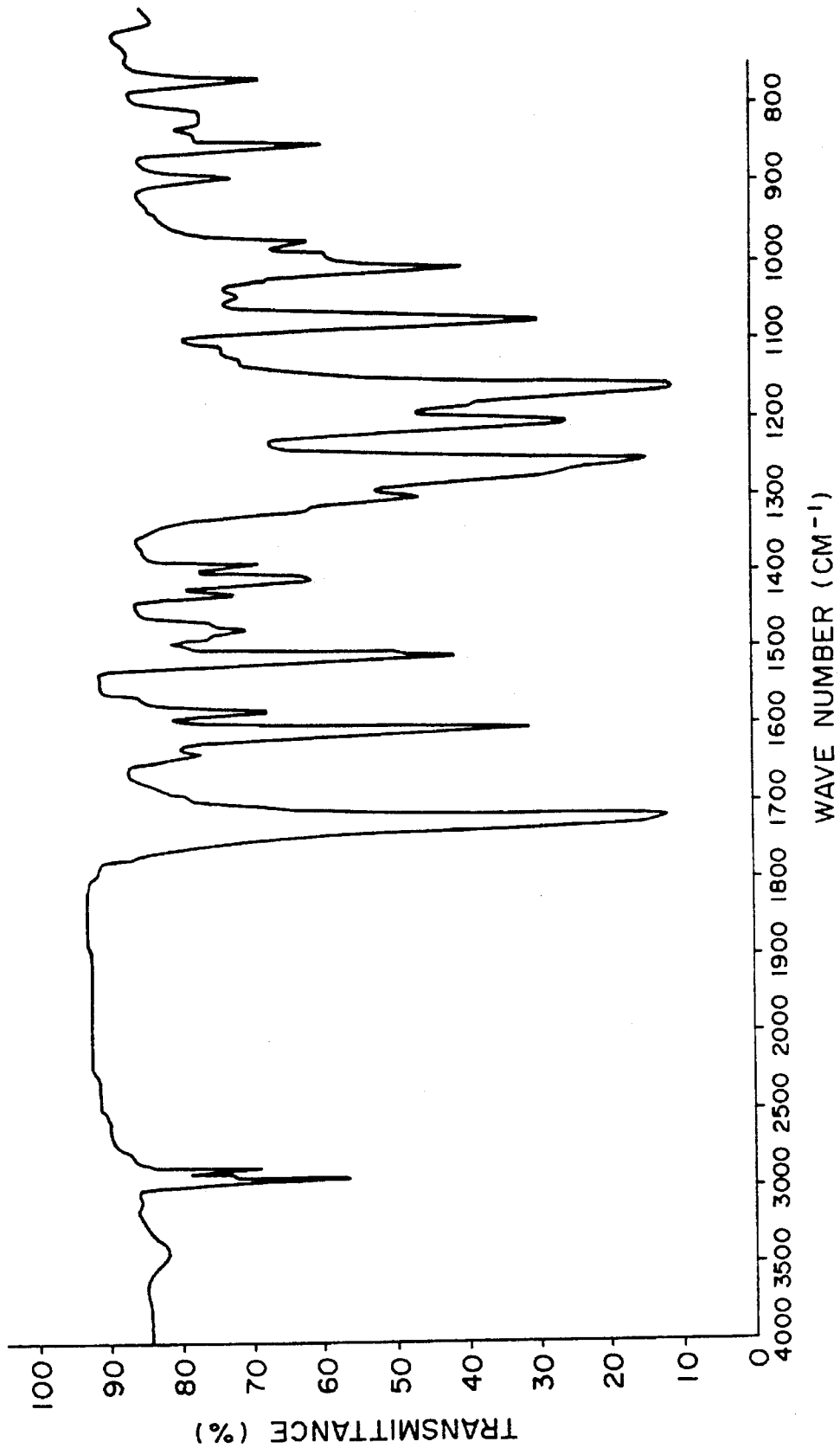
FIG. 7 is an IR chart of the polymerizable mesomorphic monomer (II-8) used in Example 2.
Figure 8:
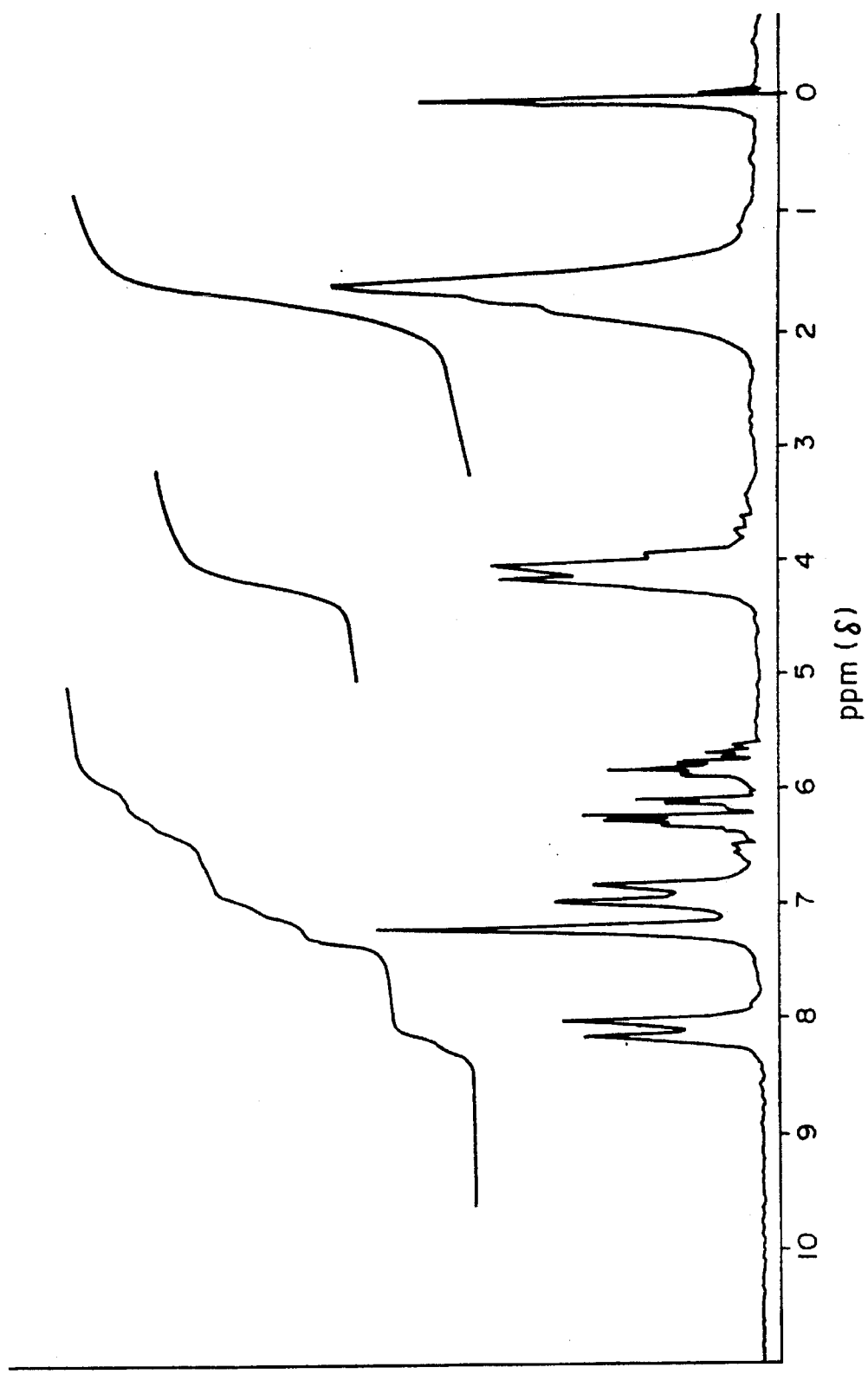
FIG. 8 is a $^1$H-NMR (proton nuclear magnetic resonance) chart of the polymerizable mesomorphic monomer (II-8) used in Example 2.

The IR chart and $^1$H-NMR (proton nuclear magnetic resonance) chart of the polymerizable mesomorphic monomer (II-8) are shown in FIGS. 7 and 8, respectively.

Figure 5:
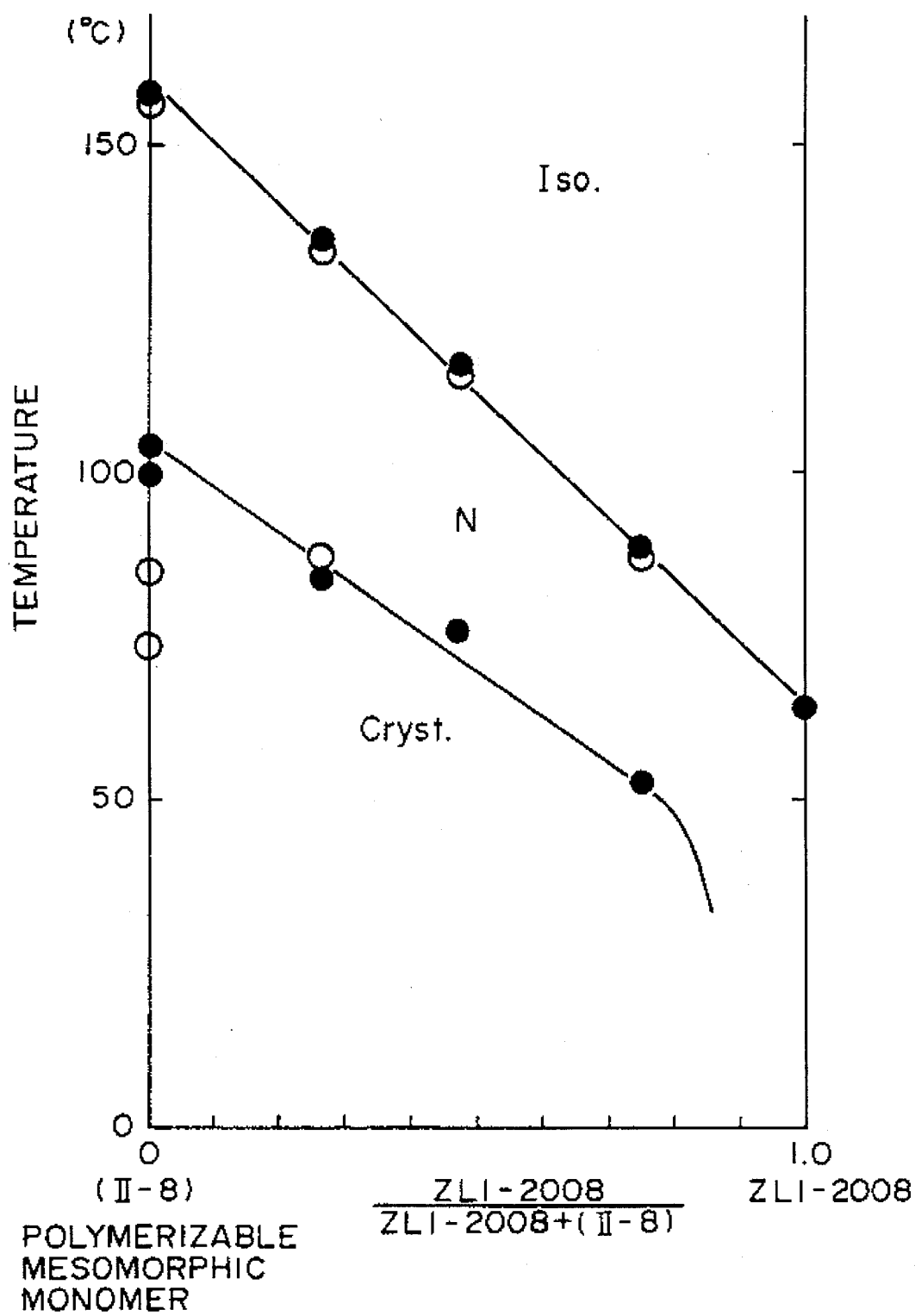
FIG. 5 is a phase diagram showing compatibility of the polymerizable mesomorphic monomer (II-8) with the low-molecular weight mesomorphic compound (ZLI-2008) used in Example 2.

The compatibility of the polymerizable mesomorphic monomer (II-8) ($\Delta\epsilon<0$) with the low-molecular weight nematic liquid crystal (I-36) (ZLI2008, $\Delta\epsilon=+16$) was examined by the DSC and the polarizing microscope, whereby a phase diagram shown in FIG. 5 was obtained.

EXAMPLE 3

A blank cell containing a composition comprising a low-molecular weight mesomorphic compound (or liquid crystal) and a polymerizable mesomorphic monomer was prepared as follows.

A 1.1 mm-thick substrate comprising a green glass (available from Matsuzaki Sinku K. K.) having thereon a vapor-deposited layer comprising a 1000 Å-thick ITO and a 500 Å-thick $SiO_2$ was coated with a solution of a polyamic acid solution (Sanever 100, available from Nissan Kagaku K. K.) diluted with a mixture solvent of N-methyl-2-pyrrolidone and 2-n-butoxyethanol by 6 times by means of a spinner coater and subjected to hot curing treatment at 270° C. to form a 200 Å-thick polyimide film. The polyimide film was subjected to alignment treatment by rubbing to provide an alignment film having a uniaxial alignment characteristic.

After silica beads as spacers (SW 8.6 μm, available from Shokubai Kasei Kogyo K. K.) with an average particle size of 8.6 microns were dispersed on the above-treated substrate, another substrate treated in the same manner as above except for silica beads treatment was superposed on the above-treated substrate, followed by sealing of the periphery thereof with an adhesive (Stract Bond, EH-454NF available from Mitsui Toatu Kagaku K. K.).

In to the above-prepared cell, a composition for providing a display layer comprising 8 wt. parts of the low-molecular weight nematic liquid crystal (I-36) used in Example 1, 4 wt. parts of the polymerizable mesomorphic monomer (II-6) prepared in Example 1 and 0.1 wt. part of a photopolymerization initiator (Irgacure 651, available from Ciba-Geigy Corp.) were injected at 100° C. by using a capillary-rise method.

The above cell held at 80° C. and exposed to a high-pressure mercury lamp (power=40 W; irradiation distance= 30 cm), thus starting polymerization in a mesomorphic state to provide a liquid crystal device containing the display layer with good transparency after about 20 minutes of irradiation. The liquid crystal device was subjected to measurement of a haze by a haze meter (Color and Color Difference Meter Model 1001 DP, available from Nippon Denshoku Kogyo K. K.), whereby a haze of 5% was obtained. The liquid crystal device was subjected to pulse voltage application (rectangular waveform of 60 Hz and ±50 V), so that the low-molecular weight nematic liquid crystal portion responded to the applied voltage to change its alignment direction but the resultant mesomorphic polymer matrix did not respond to the applied voltage at all under observation with the polarizing microscope. When the device was heated to 65° C., a portion f the display layer was changed into isotropic phase. The temperature of 65° C. was nearly equal to the clearing point of the low-molecular weight liquid crystal (I-36) used ($T_{cf}=64°$ C.), whereby the changed portion was identified as the low-molecular weight mesomorphic compound.

When a voltage (100 Hz, 20 V) was applied to the electrodes of the liquid crystal device, the display layer was changed into a scattering state. A contrast (transparent state: scattering state) was 20:1.

The display apparatus shown in FIG. 3 was prepared by employing the above liquid crystal devices, whereby a contrast of 20:1 was obtained.

Then, one of the substrates constituting the device was removed and the remaining device was dipped into methanol, whereby the low-molecular weight liquid crystal forming a dispersed phase was extracted from the display layer of the device. When the above-treated surface of the display layer was observed through a scanning electron microscope (SEM), traces of the dispersed phase had an average diameter of 0.5–3 microns.

EXAMPLE 4

A liquid crystal device was prepared and evaluated in the same manner as in Example 3 except that the polymerizable mesomorphic monomer (II-8) prepared in Example 2 was used instead of the polymerizable mesomorphic monomer (II-6) and the polymerization temperature was changed to 70° C., whereby a haze of 6% was measured.

When a voltage (100 Hz, 35 V) was applied to the electrodes of the device, the display layer was changed into a scattering state to provide the contrast of 18:1. Further, a threshold voltage (a minimum voltage required for changing the display layer into a scattering state) was 4 V to provide a good threshold characteristic.

Reference Example 1

A liquid crystal device was prepared and evaluated in the same manner as in Example 3 except that the polymerization temperature was changed to 100° C. After cooling to room temperature, the device containing the display layer in a scattering state was obtained. The device showed a haze of 70%.

EXAMPLE 5

APES (polyethersulfone) film with an ITO transparent electrode (Sumilite FST-1337, available from Sumitomo Bakelite K. K.) was coated with a solution of a mixture of a mesomorphic polymer (14) ($\Delta\epsilon<0$, Tg=38° C., $T_{cl}$ (clearing point)=165° C., Mn (number-average molecular weight calculated as corresponding to that of polystyrene through measurement by GPC (gel permeation chromatography))= 6,400) and a low-molecular weight nematic liquid crystal (I-37) (ZLI-840, available from E. Merck Co.; $\Delta\epsilon$=+12) (mixing ratio=1:1) in 1,2-dichloroethane. The resultant PES film after drying had a 16 microns-thick display layer.

Separately, a thermosetting epoxy resin was thinly applied onto a PES film identical to the above-mentioned PES film, whereby the epoxy resin layer was formed on the ITO transparent electrode. The resultant PES film was applied to the above-mentioned PES film having the display layer and passed through a pair of press rolls at 150° C. to effect alignment treatment, whereby a liquid crystal device containing a transparent display layer was obtained.

When a voltage (100 Hz, 10 V) was applied between the two ITO electrodes of the device, the display layer was changed into a scattering state to provide a contrast of 10:1.

Further, the threshold voltage was 2 V and a good threshold characteristic was observed.

Then, the display apparatus shown in FIG. 3 was prepared by using the above-mentioned devices, whereby a contrast of 20:1 was obtained when the color (RGB) display was conducted.

One of the substrate (PES films) constituting the device was removed. The remaining device was treated and subjected to observation through the SEM in the same manner as in Example 3, whereby traces of the dispersed phase had an average diameter of 2–5 microns.

EXAMPLES 6 and 7

Two liquid crystal devices were prepared and evaluated in the same manner as in Example 5 except that the mixing ratio of the low-molecular weight liquid crystal (I-37) to the mesomorphic polymer (14) was changed to those shown in Table 1 below.

TABLE 1

|  | L.C. (I-37) (wt. %) | Polymer (14) (wt. %) | Contrast |
|---|---|---|---|
| Example 6 | 40 | 60 | 12:1 |
| Example 7 | 60 | 40 | 10:1 |

EXAMPLE 8

A liquid crystal device was prepared and evaluated in the same manner as in Example 5 except that a low-molecular weight nematic liquid crystal (I-38) (TN-403, available from Dainippon Ink K. K.; $T_{cl}$=82° C. An $(n_e-n_o)$=0.258, $\Delta\epsilon$=+ 19.2) was used instead of the liquid crystal (I-37) and the thickness of the display layer was changed to 13 microns, whereby a device containing a transparent display layer was obtained.

When a voltage (100 Hz, 30 V) was applied between the two ITO electrodes of the device, the display layer was changed into a scattering state to provide a contrast of 15:1. Further, a threshold voltage of 7 V was measured and show a good threshold characteristic.

When an applied voltage was gradually increased, the display layer showed a uniformly uniaxial alignment state at the initial stage but the low-molecular weight liquid crystal portion of the display layer was gradually changed from the uniaxial alignment state to a scattering state under observation through the polarizing microscope. The resultant scattering state of the low-molecular weight liquid crystal portion was also recognized by the naked eye.

EXAMPLE 9

A liquid crystal device was prepared and evaluated in the same manner as in Example 5 except that the following materials were used and a 12 micron-thick display layer and the aligning treatment temperature of 180° C. were adopted. (Mesomorphic polymer)

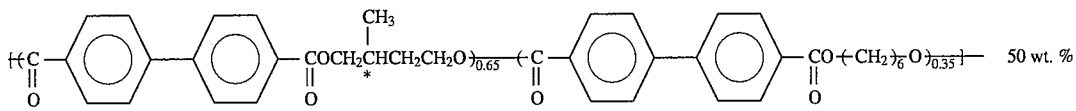

Phase transition temperature (° C.)

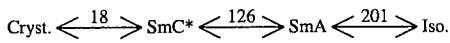

(Mn/Mw=2,800/4,000 (calculated as corresponding to the molecular weight of polystyrene by GPC); Δε<0)
(Low-molecular weight nematic liquid crystal)
ZLI-2008 (available from E. Merck Co. Δε<+16) 50 wt. %

When a voltage (100 Hz, 30 V) was applied between the two ITO electrodes of the device, the display layer was changed into a scattering state to provide a contrast of 9:1.

EXAMPLE 10

A crosslinking mesomorphic monomer (IV-13) was synthesized by a method disclosed in "Macromol. Chem.", 190, 3201 (1989) by D. J. Broer, R. A. M. Hikmet and Ger Challa.

The crosslinking mesomorphic monomer (IV-13) showed the following phase transition series.

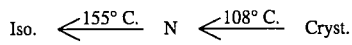

Figure 9:
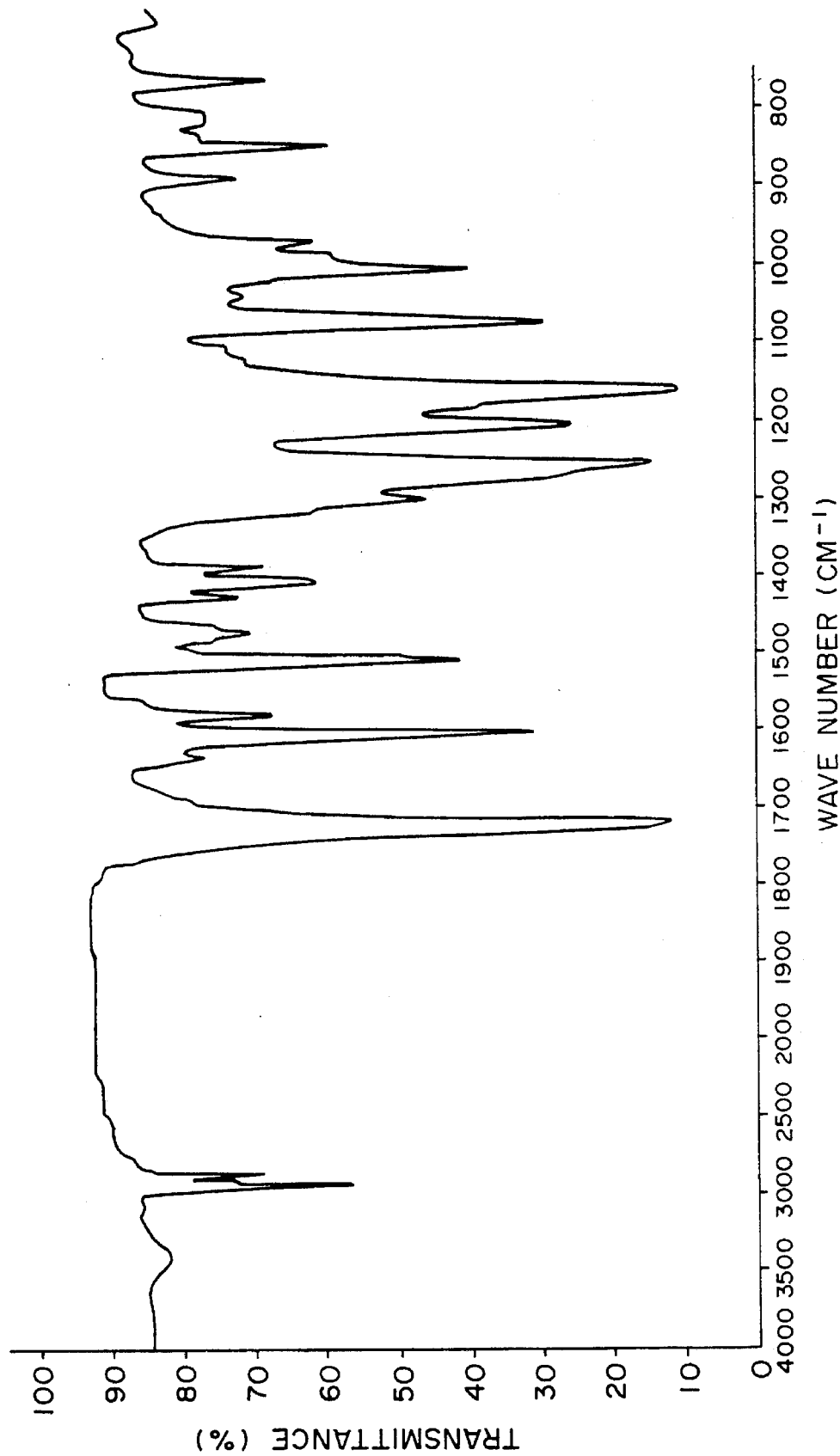
FIG. 9 is an IR chart of the crosslinking mesomorphic monomer (IV-13) used in Example 10.
Figure 10:
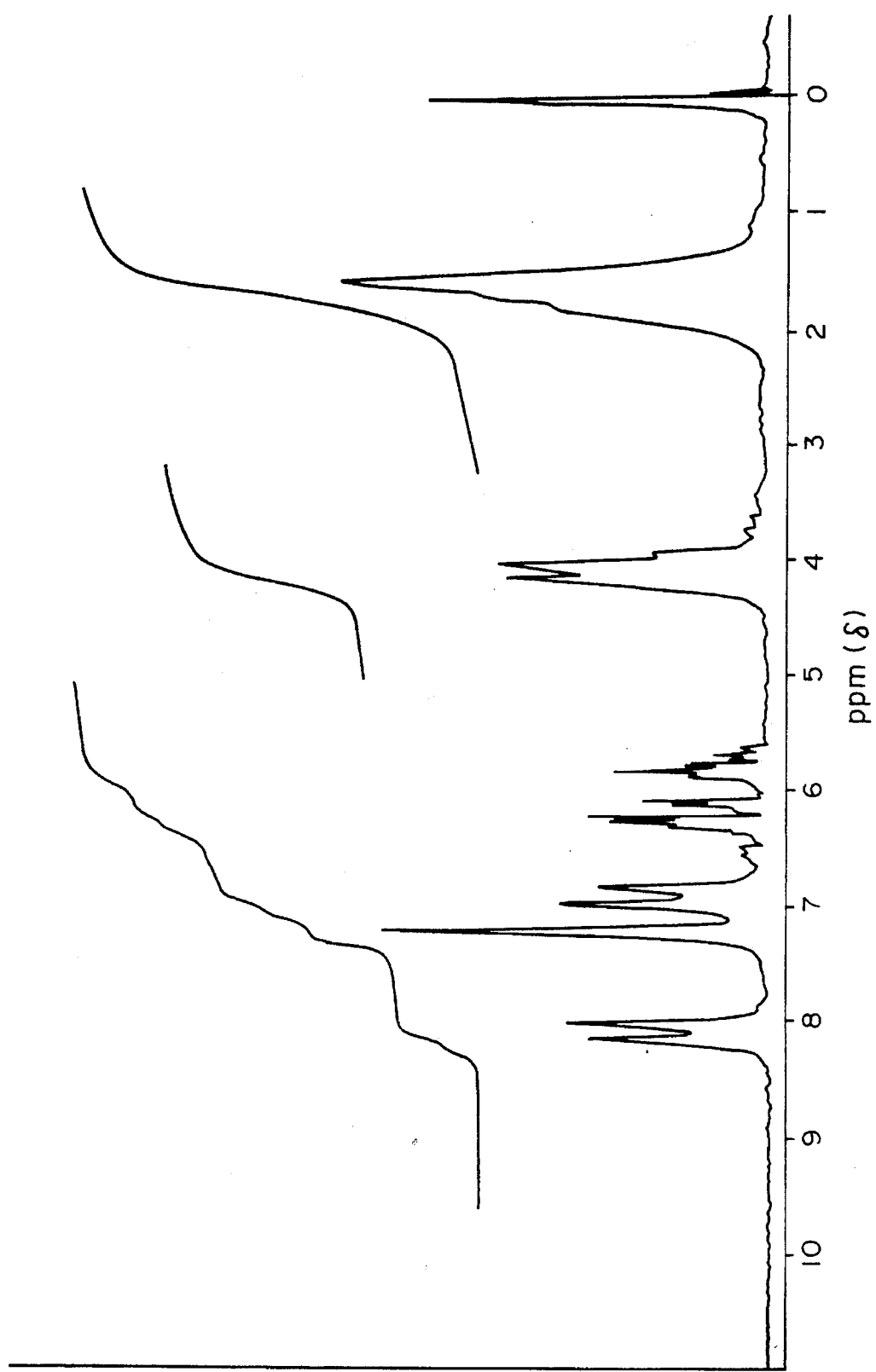
FIG. 10 is a $^1$H-NMR chart of the crosslinking mesomorphic monomer (IV-13) used in Example 10.

The IR chart and $^1$H-NMR (proton nuclear magnetic resonance) of the crosslinking mesomorphic monomer (IV-13) are shown in FIGS. 9 and 10, respectively.

A blank cell was prepared in the same manner as in Example 3.

A composition was prepared by mixing the following ingredients in the indicated proportions.

| Ingredients | wt. parts |
| --- | --- |
| Low-molecular weight nematic liquid crystal (ZLI-2008, available from E. Merck Co.) | 50 |
| Polymerizable mesomorphic monomer (II-11) (Δε = −3.3) | 10 |
| Polymerizable oligomer (IV-20) (Artresin UN-2500 (urethane acrylate polyester), available from Negami Kogyo K.K.) | 10 |
| Crosslinking mesomorphic monomer (IV-13) | 10 |
| Polymerization initiator (Irgacure 651, available from Ciba-Geigy Corp.) | 0.3 |

The above-prepared composition was injected into the blank cell at 100° C. by using the capillary-rise method, followed by polymerization in its mesomorphic state at 80° C. by exposure to the high-pressure mercury lamp (power= 40 W; irradiation distance=30 cm) to provide a liquid crystal device containing the display layer with good transparency after about 20 minutes of irradiation.

When a voltage (100 Hz, 5 V) was applied between the electrodes of the device, a haze of 24% was measured by the hazemeter. When the applied voltage was increased to 20 V, the low-molecular weight liquid crystal portion entirely responded to the voltage to show a haze of 50%. Further, when the voltage was decreased to 5 V, the haze was lowered to 23%, thus showing a good response characteristic substantially free from hysteresis phenomenon.

A display apparatus as shown in FIG. 3 was prepared by using the above device. A contrast of 23:1 was obtained on the screen.

One of the substrates constituting the device was removed. The remaining device was treated and subjected to observation through the SEM in the same manner as in Example 3, whereby traces of the dispersed phase had an average diameter of 0.6–2.6 microns.

Separately, the dielectric anisotropy Δε of a mesomorphic polymer derived from the polymerizable mesomorphic monomer (II-11) was measured by the above-mentioned method, whereby the mesomorphic polymer had a dielectric anisotropy Δε of −3.1.

As described hereinabove, according to the present invention, there is provided a liquid crystal device containing a display layer comprising a main chain-type mesomorphic polymer having an ester linkage or a mesomorphic polymer derived from a polymerizable mesomorphic monomer and a low-molecular weight mesomorphic compound. The mesomorphic polymer used in the present invention has a good alignment-controlling effect to align the low-molecular weight mesomorphic compound in one direction parallel to that of the mesomorphic polymer in the absence of an electric field, thus providing a high contrast by voltage application.

Further, when the uniform alignment state of the mesomorphic polymer is once fixed at a temperature below the glass transition temperature of the polymer, the polymer does not respond at about room temperature to maintain its uniform alignment state in contrast with the conventional mesomorphic polymer which fails to provide such uniform alignment state, thus leading to poor contrast of display. As a result, the low-molecular weight mesomorphic compound of the present invention shows a good threshold characteristic of electric field response, so that a good gradation display with a large area, high contrast, good threshold characteristic and no hysteresis phenomenon can be obtained when the liquid crystal device is driven.

What is claimed is:

1. A liquid crystal device, comprising: a pair of electrode plates and a display layer disposed therebetween comprising a main chain-type ferroelectric mesomorphic polymer having an ester linkage and a low-molecular weight mesomorphic compound incompatible with said main chain-type ferroelectric mesomorphic polymer, wherein said low-molecular weight mesomorphic compound is dispersed in said ferroelectric mesomorphic polymer to have an average particle diameter of 0.1–10 μm.

2. A device according to claim 1, which further comprises an alignment control layer formed on said electrode plates.

3. A display apparatus, including: a liquid crystal device according to claim 1, means for emitting light, means for applying voltage to said device, and means for separating said light into transmitted light and scattered light.

4. A display method, comprising: illuminating a liquid crystal device according to claim 1 with light and effecting display by employing the resultant scattered light.

5. A method, according to claim 4, wherein an electric field is applied to said liquid crystal device to cause an electric field response of said low-molecular weight mesomorphic compound, which response results in a difference in scattering degree of said scattered light.

6. A device according to claim 1, wherein said low-molecular weight mesomorphic compound is a chiral smetic mesomorphic compound.

7. A liquid crystal device, comprising: a pair of electrode plates and a display layer disposed therebetween comprising a ferroelectric mesomorphic polymer and a low-molecular weight mesomorphic compound wherein said ferroelectric mesomorphic polymer has been formed through polymerization in mesomorphic state of a composition comprising a polymerizable mesomorphic monomer and the low-molecular weight mesomorphic compound, wherein said low-molecular weight mesomorphic compound is dispersed in said ferroelectric mesomorphic polymer to have an average particle diameter of 0.1–10 µm.

8. A device according to claim 7, wherein said mesomorphic polymer is incompatible with said low-molecular weight mesomorphic compound.

9. A device according to claim 7, which further comprises an alignment control layer formed on said electrode plates.

10. A display apparatus, including: a liquid crystal device according to claim 7, means for emitting light, means for applying voltage to said device, and means for separating said light into transmitted light and scattered light.

11. A display method, comprising: illuminating a liquid crystal device according to claim 7 with light and effecting display by employing the resultant scattered light.

12. A method, according to claim 11, wherein an electric field is applied to said liquid crystal device to cause an electric field response of said low-molecular weight mesomorphic compound, which response results in a difference in scattering degree of said scattered light.

13. A device according to claim 6, wherein said low-molecular weight mesomorphic compound is a chiral smetic mesomorphic compound.

14. A liquid crystal device, comprising: a pair of electrode plates and a display layer disposed therebetween comprising a ferroelectric mesomorphic polymer having a dielectric anisotropy $\Delta\epsilon$ of −3.0 or below and a low-molecular weight mesomorphic compound incompatible with said ferroelectric mesomorphic polymer and having a positive dielectric anisotropy, wherein said low-molecular weight mesomorphic compound is dispersed in said ferroelectric mesomorphic polymer to have an average particle diameter of 0.1–10 µm.

15. A device according to claim 14, which further comprises an alignment control layer formed on said electrode plates.

16. A device according to claim 14, wherein said mesomorphic polymer is obtained from a polymerizable mesomorphic monomer by polymerization in a mesomorphic state.

17. A device according to claim 16, which further comprises an alignment control layer formed on said electrode plates.

18. A display apparatus, including: a liquid crystal device according to claim 14, means for emitting light, means for applying voltage to said device, and means for separating said light into transmitted light and scattered light.

19. A display apparatus, including: a liquid crystal device according to claim 16, means for emitting light, means for applying voltage to said device, and means for separating said light into transmitted light and scattered light.

20. A display method, comprising: illuminating a liquid crystal device according to claim 14 with light and effecting display by employing the resultant scattered light.

21. A display method, comprising: illuminating a liquid crystal device according to claim 16 with light and effecting display by employing the resultant scattered light.

22. A method, according to claim 20, wherein a electric field is applied to said liquid crystal device to cause an electric field response of said low-molecular weight mesomorphic compound, which response results in a difference in scattering degree of said scattered light.

23. A method, according to claim 21, wherein an electric field is applied to said liquid crystal device to cause an electric field response of said low-molecular weight mesomorphic compound, which response results in a difference in scattering degree of said scattered light.

24. A device according to claim 12, wherein said low-molecular weight mesomorphic compound is a chiral smetic mesomorphic compound.

* * * * *

UNITED STATES PATENT AND TRADEMARK OFFICE
CERTIFICATE OF CORRECTION

PATENT NO. : 5,540,858
DATED : July 30, 1996
INVENTOR(S): KAZUO YOSHINAGA ET AL.    Page 1 of 4

It is certified that error appears in the above-identified patent and that said Letters Patent is hereby corrected as shown below:

COLUMN 1

Line 50, "Donne et al." should read --Doane et al.--.

COLUMN 3

Line 65, ""Myler"," should read --"Mylar",--.

COLUMN 4

Line 54, "deteriorate" should read --deteriorates--.

COLUMN 6

Line 37, "in-compatible" should read --incompatible--.

COLUMN 11

Line 63, "show" should read --shown--.

COLUMN 15

Formula I-12, " 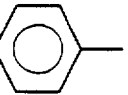 "

should read --  --.

UNITED STATES PATENT AND TRADEMARK OFFICE
CERTIFICATE OF CORRECTION

PATENT NO. : 5,540,858

DATED : July 30, 1996

INVENTOR(S): KAZUO YOSHINAGA ET AL. Page 2 of 4

It is certified that error appears in the above-identified patent and that said Letters Patent is hereby corrected as shown below:

COLUMN 21

```
Line 65, "in compatible" should read --incompatible--.
Line 67, "in-compatibility" should read
   --incompatibility--.
```

COLUMN 22

```
Line 51, "in-compatibility" should read
   --incompatibility--.
```

COLUMN 23

```
Line 24, "-(CH₂)ₙ—(n=0-15)," should read
   -- -(CH₂)ₙ- (n=0-15),--.
Line 25, "-CH₂CH₂—O)ₙ—(n=1-4)," should read
   -- -(CH₂CH₂-O)ₙ- --.
Line 33, "-(CH₂CH₂CH₂CH₂O)ₙ—(n=1-3)," should read
   -- -(CH₂CH₂CH₂CH₂O)ₙ- (n-1-3),--.
Line 34, "-(CH₂CH₂CH₂O)ₙ—(n=1-4)," should read
   -- -(CH₂CH₂CH₂O)ₙ- (n=1-4),--.
Line 35, "-(CH₂)ₙ-O—(n=0-15)." should read
   -- -(CH₂)ₙ-O- (n=0-15).--.
```

UNITED STATES PATENT AND TRADEMARK OFFICE
CERTIFICATE OF CORRECTION

PATENT NO. : 5,540,858
DATED : July 30, 1996
INVENTOR(S): KAZUO YOSHINAGA ET AL.

It is certified that error appears in the above-identified patent and that said Letters Patent is hereby corrected as shown below:

COLUMN 24

Line 55, "ore" should read --more--.

COLUMN 29

Line 7, "sufficient" should read --sufficiently--.

COLUMN 30

Line 8, "Ciga-Geigy Corp.)" should read --Ciba-Geigy Corp.)--.
    Line 10, "Ciga-Geigy Corp.)" should read --Ciba-Geigy Corp.)--.

COLUMN 33

Line 20, "dichloic" should read --dichroic--.
    Line 43, "Syrup 24," should read --Symp. 24,--.
    Line 44, "Noëet al." should read --Noël et al.--.

COLUMN 34

Line 60, "f" should read --of--.

COLUMN 35

Line 40, "APES" should read --A PES--.

UNITED STATES PATENT AND TRADEMARK OFFICE
CERTIFICATE OF CORRECTION

PATENT NO. : 5,540,858
DATED : July 30, 1996
INVENTOR(S): KAZUO YOSHINAGA ET AL.     Page 4 of 4

It is certified that error appears in the above-identified patent and that said Letters Patent is hereby corrected as shown below:

COLUMN 36

Line 44, "show" should read --showed--.

COLUMN 38

Line 65, "claim 1" should read --claim 1,--.

COLUMN 39

Line 29, "claim 7" should read --claim 7,--.
Line 36, "claim 6," should read --claim 7,--.

COLUMN 40

Line 25 "claim 14" should read --claim 14,--.
Line 28, "claim 16" should read --claim 16,--.
Line 30, "a" should read --an--.
Line 40, "claim 12," should read --claim 14,--.

Signed and Sealed this

Seventeenth Day of December, 1996

Attest:

BRUCE LEHMAN

*Attesting Officer*     *Commissioner of Patents and Trademarks*